US012020644B2

(12) United States Patent
Kato

(10) Patent No.: US 12,020,644 B2
(45) Date of Patent: Jun. 25, 2024

(54) CURRENT LIMITING CIRCUIT, DISPLAY DEVICE, AND CURRENT LIMITING METHOD

(71) Applicant: JOLED INC., Tokyo (JP)

(72) Inventor: Toshiyuki Kato, Tokyo (JP)

(73) Assignee: JDI DESIGN AND DEVELOPMENT G.K., Tokyo (JP)

( * ) Notice: Subject to any disclaimer, the term of this patent is extended or adjusted under 35 U.S.C. 154(b) by 0 days.

(21) Appl. No.: 17/987,273

(22) Filed: Nov. 15, 2022

(65) Prior Publication Data

US 2023/0169920 A1 Jun. 1, 2023

(30) Foreign Application Priority Data

Nov. 26, 2021 (JP) ................................. 2021-192495

(51) Int. Cl.
*G09G 3/3233* (2016.01)

(52) U.S. Cl.
CPC ....... *G09G 3/3233* (2013.01); *G09G 2310/08* (2013.01); *G09G 2330/02* (2013.01); *G09G 2330/021* (2013.01)

(58) Field of Classification Search
None
See application file for complete search history.

(56) References Cited

U.S. PATENT DOCUMENTS 11,100,859 B2 * 8/2021 Kato .................... H04N 25/705
2009/0174634 A1 * 7/2009 Kohno ................ G09G 3/3233 345/84
2010/0171749 A1 * 7/2010 Chen .................... G09G 3/3648 345/212
2012/0069062 A1 * 3/2012 Ishihara ............... G09G 3/3611 345/690
2014/0104258 A1 * 4/2014 Oh ....................... G09G 3/3233 345/76
2020/0211453 A1 * 7/2020 Su ........................ G09G 3/3208
2020/0279528 A1 * 9/2020 Kato .................... H04N 25/705
2021/0090499 A1 * 3/2021 Kato .................... G09G 3/3233
2022/0398974 A1 * 12/2022 Yoon .................... G09G 3/3225
2023/0154436 A1 * 5/2023 Lee .......................... G09G 5/10 345/690
2023/0222971 A1 * 7/2023 Kato .................... G09G 3/3225 345/204
2023/0237962 A1 * 7/2023 Fujiwara ............. G09G 3/3208 345/212

FOREIGN PATENT DOCUMENTS

JP 2007-212644 8/2007

* cited by examiner

*Primary Examiner* — Dorothy Harris
(74) *Attorney, Agent, or Firm* — Greenblum & Bernstein, P.L.C.

(57) ABSTRACT

A current limiting circuit includes: a delay circuit that receives a video signal, and outputs a delay signal obtained by delaying the video signal by a time period corresponding to one frame; a calculation circuit that receives the video signal, and calculates a gain by which the delay signal is to be multiplied, based on power consumption of the pixels corresponding to the delay signal and power consumption of the pixels corresponding to the video signal; and a gain multiplication circuit that multiplies the delay signal by the gain.

19 Claims, 21 Drawing Sheets

CURRENT LIMITING CIRCUIT, DISPLAY DEVICE, AND CURRENT LIMITING METHOD

CROSS REFERENCE TO RELATED APPLICATION

The present application is based on and claims priority of Japanese Patent Application No. 2021-192495 filed on Nov. 26, 2021. The entire disclosure of the above-identified application, including the specification, drawings and claims is incorporated herein by reference in its entirety.

FIELD

The present disclosure relates to a current limiting circuit, a display device, and a current limiting method.

BACKGROUND

Conventionally, display devices, such as organic electroluminescent (EL) display devices in which each pixel has a self-luminous element have been developed. With such display devices, increase in the size of the display panel is desired. An increase in the size of the display panel causes an increase in electric power consumed by the display device. In view of this, there is a technique for reducing power consumption of a display device (see Patent Literature 1 (PTL 1)). In the display device disclosed in PTL 1, the power consumption of the display panel is reduced by calculating power consumption of the display panel for each horizontal period (horizontal synchronization period) based on a video signal, and, based on the calculation result, limiting a current to be supplied to each pixel of the display panel. In this way, the display device disclosed in PTL 1 attempts to reduce the power consumption of the display panel to a control target power value or less.

CITATION LIST

Patent Literature

PTL 1: Japanese Unexamined Patent Application Publication No. 2007-212644

SUMMARY

Technical Problem

However, with the display device disclosed in PTL 1, when a luminance represented by a video signal abruptly increases as in the case of, for example, switching from all-black display to all-white display, the power consumption of the display panel may exceed the control target power value.

The present disclosure has been conceived in view of the above circumstances, and has an object to provide a current limiting circuit and so on capable of reducing power consumption of the display panel even when the luminance represented by a video signal abruptly increases.

Solution to Problem

In order to achieve the above object, a current limiting circuit according to one aspect of the present disclosure is a current limiting circuit that receives a video signal for a display panel including pixels, and limits current consumption of the pixels, the current limiting circuit including: a delay circuit that receives the video signal, and outputs a delay signal obtained by delaying the video signal by a time period corresponding to one frame; a calculation circuit that receives the video signal, and calculates a gain by which the delay signal is to be multiplied, based on power consumption of the pixels corresponding to the delay signal and power consumption of the pixels corresponding to the video signal; and a gain multiplication circuit that multiplies the delay signal by the gain.

Also, a current limiting circuit according to one aspect of the present disclosure is a current limiting circuit that receives a video signal for a display panel including pixels, and limits current consumption of the pixels, the current limiting circuit including: a delay circuit that receives the video signal, and outputs a delay signal obtained by delaying the video signal by a time period corresponding to one frame; a calculation circuit that receives the video signal, and calculates a gain by which the delay signal is to be multiplied, based on power consumption of the pixels corresponding to the video signal for two continuous frames; and a gain multiplication circuit that multiplies the delay signal by the gain.

Further, in order to achieve the above object, a display device according to one aspect of the present disclosure includes the current limiting circuit and the display panel.

Furthermore, in order to achieve the above object, a current limiting method according to one aspect of the present disclosure is a current limiting method for limiting current consumption of pixels included in a display panel, the current limiting method including: outputting a delay signal obtained by delaying a video signal by a time period corresponding to one frame, the video signal being a signal for the display panel including the pixels; calculating a gain by which the delay signal is to be multiplied, based on power consumption of the pixels corresponding to the delay signal and power consumption of the pixels corresponding to the video signal; and multiplying the delay signal by the gain.

In addition, in order to achieve the above object, a current limiting method according to one aspect of the present disclosure is a current limiting method for limiting current consumption of pixels included in a display panel, the current limiting method including: outputting a delay signal obtained by delaying a video signal by a time period corresponding to one frame, the video signal being a signal for the display panel including the pixels; calculating a gain by which the delay signal is to be multiplied, based on power consumption of the pixels corresponding to the video signal for two continuous frames; and multiplying the delay signal by the gain.

Advantageous Effects

According to the present disclosure, it is possible to provide a current limiting circuit and so on capable of reducing power consumption of a display panel even when the luminance represented by a video signal abruptly increases.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
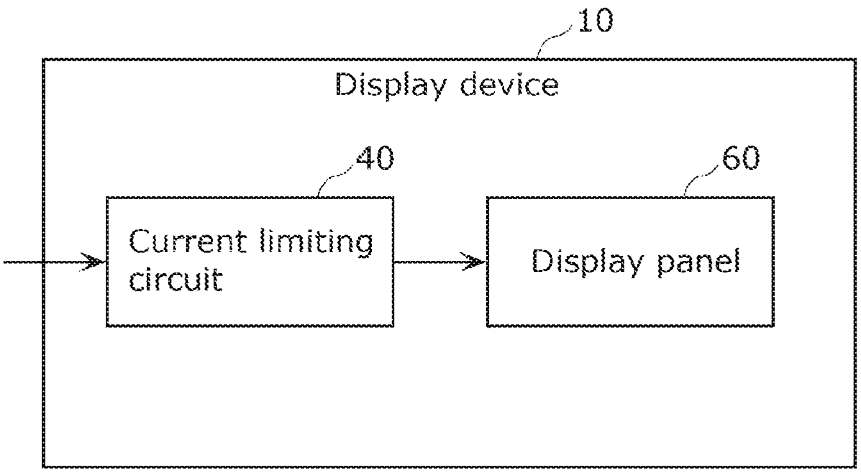
FIG. 1 is a block diagram illustrating a configuration of a display device according to Embodiment 1.

Hereinafter, exemplary embodiments of the present disclosure are described with reference to the drawings. Note that each of the embodiments described below shows a specific example of the present disclosure. Therefore, the numerical values, shapes, materials, constituent elements, the arrangement and connection of the constituent elements, steps, the processing order of the steps etc. illustrated in the following embodiments are mere examples, and are not intended to limit the present disclosure.

Note that the drawings are represented schematically, and are not necessarily precise illustrations. Also, in the drawings, essentially the same constituent elements are given the same reference signs, and overlapping descriptions thereof are omitted or simplified.

Embodiment 1

A current limiting circuit, a display device, and a current limiting method according to Embodiment 1 are described.

[1-1. Overall Configuration of Display Device]

An overall configuration of the display device according to the present embodiment is described with reference to FIG. 1 through FIG. 6.

Figure 2:
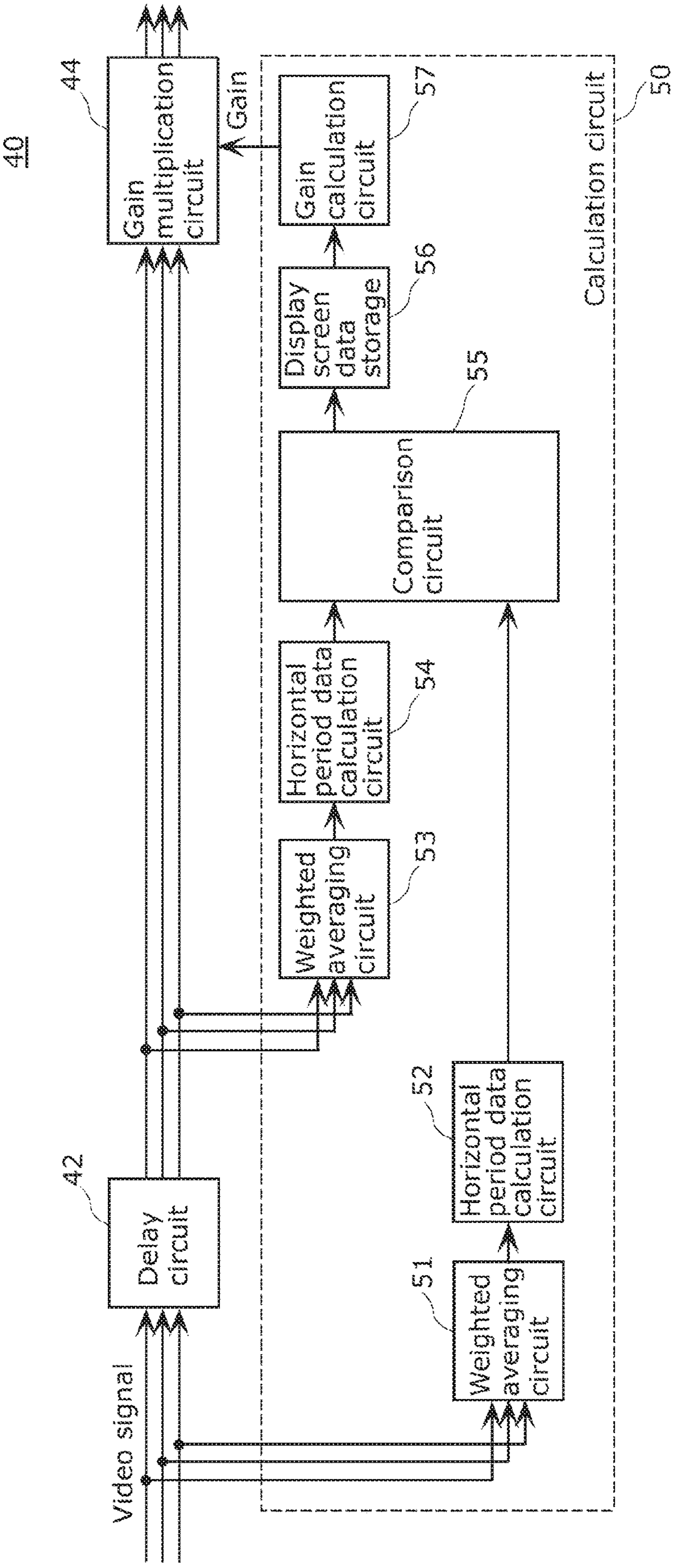
FIG. 2 is a block diagram illustrating a functional configuration of a current limiting circuit according to Embodiment 1.
Figure 3:
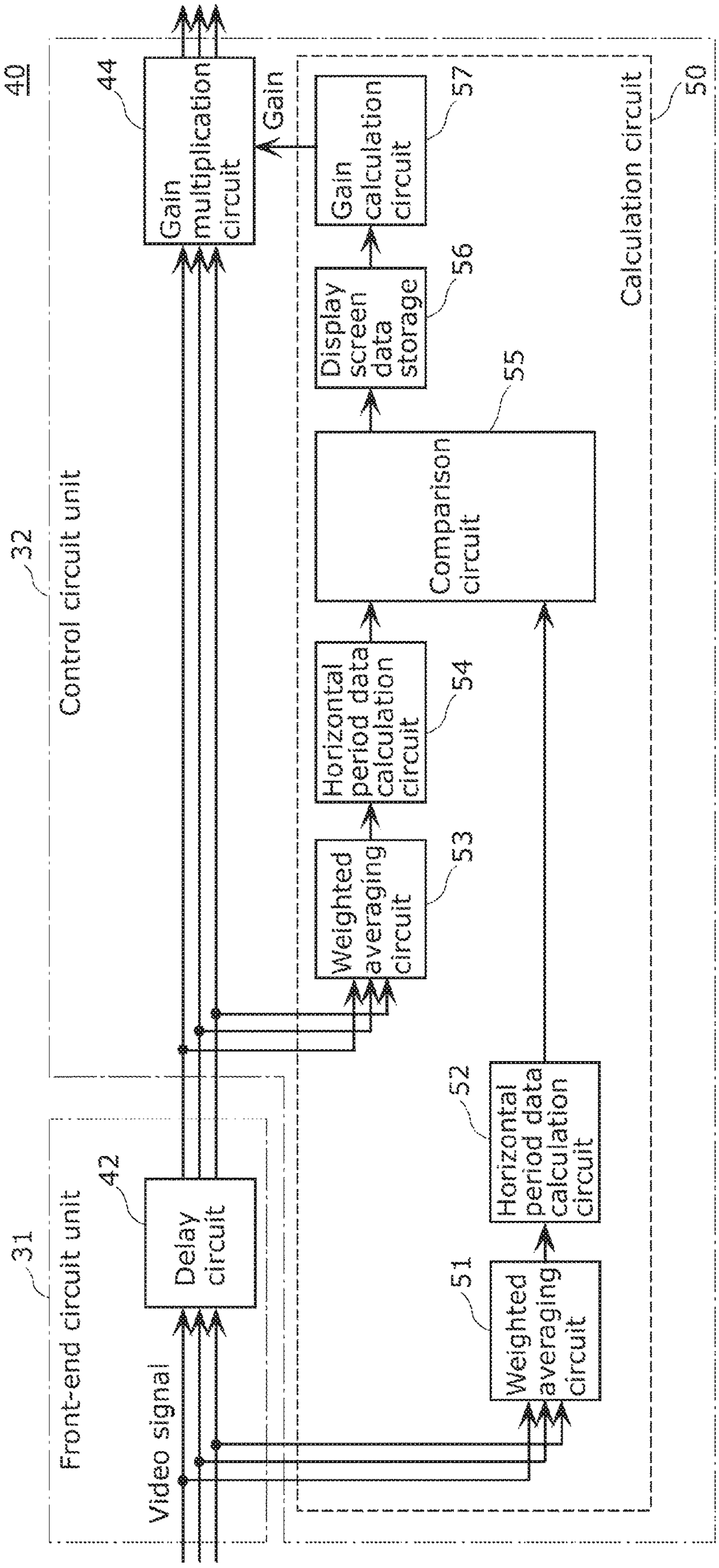
FIG. 3 is a block diagram illustrating one example of the form of integration of the current limiting circuit according to Embodiment 1.
Figure 4:
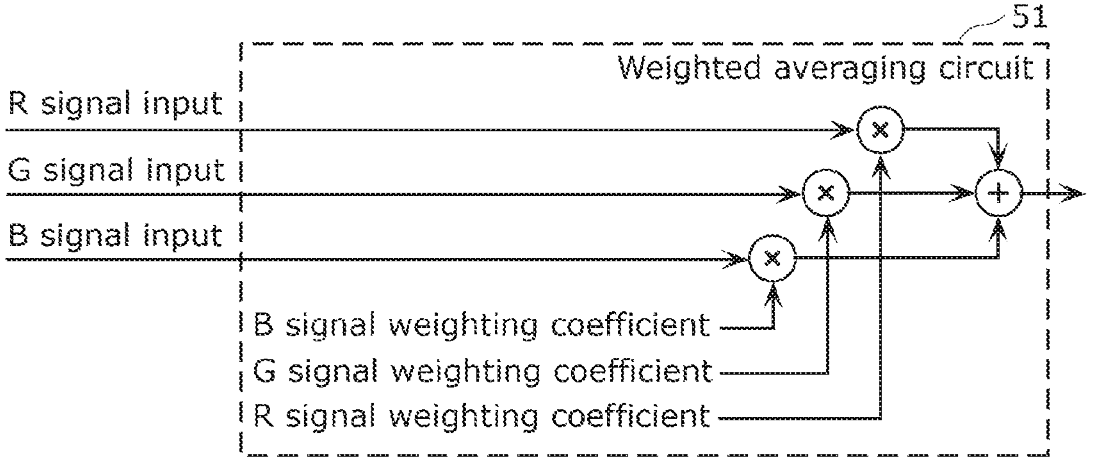
FIG. 4 is a block diagram illustrating a functional configuration of a weighted averaging circuit included in the current limiting circuit according to Embodiment 1.
Figure 5:
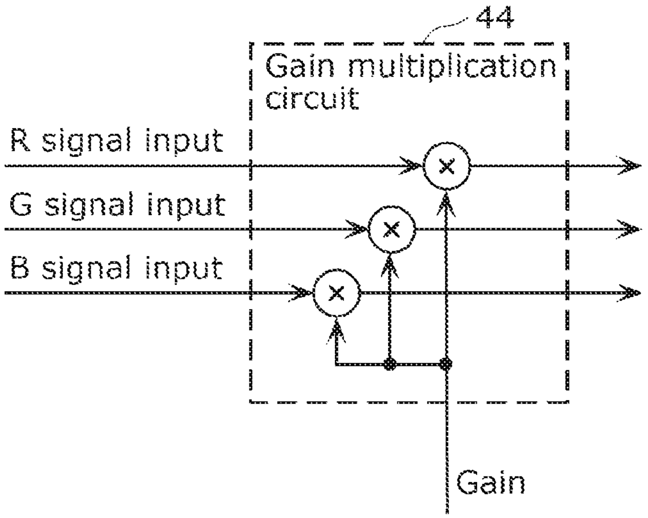
FIG. 5 is a block diagram illustrating a functional configuration of a gain multiplication circuit included in the current limiting circuit according to Embodiment 1.
Figure 6:
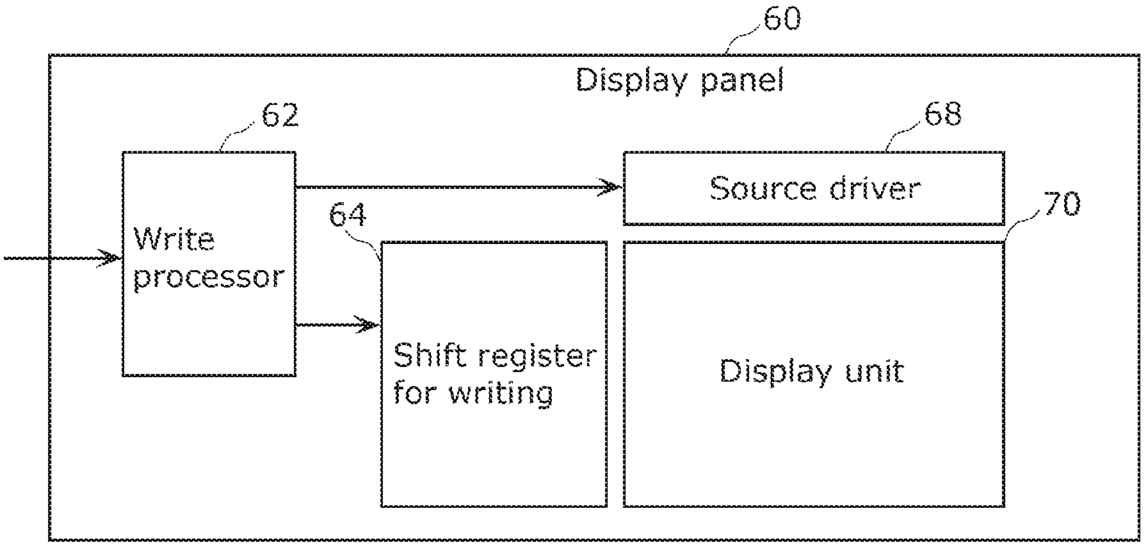
FIG. 6 is a block diagram illustrating a functional configuration of a display panel included in the display device according to Embodiment 1.

FIG. 1 is a block diagram illustrating a configuration of display device 10 according to the present embodiment. FIG. 2 is a block diagram illustrating a functional configuration of current limiting circuit 40 according to the present embodiment. FIG. 3 is a block diagram illustrating one example of the form of integration of current limiting circuit 40 according to the present embodiment. FIG. 4 and FIG. 5 are block diagrams illustrating functional configurations of weighted averaging circuit 51 and gain multiplication circuit 44, respectively, which are included in current limiting circuit 40 according to the present embodiment. FIG. 6 is a block diagram illustrating a functional configuration of display panel 60 included in display device 10 according to the present embodiment.

As illustrated in FIG. 1, display device 10 includes current limiting circuit 40 and display panel 60.

Display panel 60 is a panel which includes pixels each having a self luminous element, and which displays an image corresponding to a video signal. As illustrated in FIG. 6, display panel 60 includes display unit 70, write processor 62, source driver 68, and shift register for writing 64. Display unit 70 includes pixels arranged in a matrix, and displays an image corresponding to a video signal. Write processor 62 outputs a data signal and a control signal for writing display data to display unit 70. Write processor 62 is a circuit included in a timing-controller (TCON) chip. Source driver 68 outputs the data signal to display unit 70.

Shift register for writing 64 outputs, to display unit 70, a write signal which is a control signal for writing the data signal to display unit 70.

Current limiting circuit 40 is a circuit that receives a video signal for display panel 60 including pixels, and reduces the power consumption of display panel 60 by limiting current consumption of the pixels. In the present embodiment, current limiting circuit 40 limits a current to be supplied to the pixels in a case where a power value supplied to the pixels corresponding to power consumption of display panel 60 is greater than a control target power value. Current limiting circuit 40 limits current consumption of the pixels by reducing pixel values of the video signal by multiplying pixel values included in the video signal by a gain that is less than or equal to 1, and outputting a video signal including the reduced pixel values to display panel 60. As illustrated in FIG. 2, current limiting circuit 40 includes delay circuit 42, gain multiplication circuit 44, and calculation circuit 50.

Current limiting circuit 40 is implemented, for example, as an integrated circuit. Current limiting circuit 40 may be integrated as one part of a TCON chip together with write processor 62 included in display panel 60 or the like, or may be a separate integrated circuit. Further, the form of integration of current limiting circuit 40 is not limited to these forms. For example, as illustrated in FIG. 3, current limiting circuit 40 may include two integrated circuit units, namely, front end circuit unit 31 and control circuit unit 32. Front end circuit unit 31 includes delay circuit 42. Control circuit unit 32 includes the constituent elements other than delay circuit 42 of current limiting circuit 40. In the example illustrated in FIG. 3, control circuit unit 32 may be integrated as one part of a TCON chip, and front end circuit unit 31 may be integrated as an integrated circuit other than a TCON chip. Note that current limiting circuit 40 may be implemented using an electric circuit or the like other than an integrated circuit.

Delay circuit 42 is a circuit that receives a video signal and outputs a delay signal obtained by delaying the video signal by a time period corresponding to one frame. A time period corresponding to one frame corresponds to a vertical period (vertical synchronization period) of display panel 60. A time period corresponding to one frame is also referred to hereinafter as "one frame time period".

Calculation circuit 50 is a circuit that receives a video signal, and calculates a gain by which a delay signal is to be multiplied. Calculation circuit 50 calculates the gain by which the delay signal is to be multiplied, based on power consumption of pixels corresponding to the delay signal and power consumption of the pixels corresponding to the video signal. In the present embodiment, calculation circuit 50: calculates a display screen power value that is a prediction value of power consumption of the pixels corresponding to a signal for one frame included in the delay signal for the one frame; and calculates a display screen power value that is a prediction value of power consumption of the pixels corresponding to a signal for one frame included in the video signal for the one frame. Calculation circuit 50 sets the gain to be less than 1 when the display screen power value is greater than a control target power value that is a control target upper limit of power consumption of the pixels. When the display screen power value is greater than the control target power value that is a control target upper limit of power consumption of the pixels, calculation circuit 50 calculates a value by dividing the control target power value by the display screen power value, and sets the gain to less than or equal to the value calculated. When the display screen power value is not greater than the control target power value, calculation circuit 50 sets the gain to 1. Calculation circuit 50 calculates and outputs the gain for each period shorter than a vertical period of the video signal. In the present embodiment, calculation circuit 50 calculates and outputs a gain for each horizontal period. Calculation circuit 50 includes weighted averaging circuits 51 and 53, horizontal period data calculation circuits 52 and 54, comparison circuit 55, display screen data storage 56, and gain calculation circuit 57.

Weighted averaging circuits 51 and 53 are circuits each of which calculates a weighted average of pixel values included in a video signal. In the present embodiment, the video signal (and the delay signal) includes a red (R) signal, a green (G) signal, and a blue (B) signal. Weighted averaging circuit 53 is one example of a first weighted averaging circuit that calculates a weighted average of a pixel value of the R signal included in the delay signal, a pixel value of the G signal included in the delay signal, and a pixel value of the B signal included in the delay signal. Weighted averaging circuit 51 is one example of a second weighted averaging circuit that calculates a weighted average of a pixel value of the R signal included in the video signal, a pixel value of the G signal included in the video signal, and a pixel value of the B signal included in the video signal. As illustrated in FIG. 4, weighted averaging circuit 51 multiplies display data of each of an R signal, a G signal, and a B signal by weighting coefficients (R signal weighting coefficient, G signal weighting coefficient, and B signal weighting coefficient) according to power consumption characteristics of the respective R, G, and B pixels of display unit 70, and calculates the sum of these multiplication results. Weighted averaging circuit 53 has the same circuit configuration as that of weighted averaging circuit 51. Weighted averaging circuit 51 receives a video signal, and weighted averaging circuit 53 receives a delay signal that is output from delay circuit 42.

Horizontal period data calculation circuits 52 and 54 calculate horizontal period power conversion data corresponding to display data for each horizontal period. In the present embodiment, horizontal period data calculation circuits 52 and 54 calculate an integrated value or an average value of weighted averages output by weighted averaging circuits 51 and 53 in the horizontal period as horizontal period power conversion data (level integrated value), respectively.

Comparison circuit 55 is a circuit which compares power conversion data calculated based on a delay signal output from delay circuit 42, and power conversion data calculated based on a video signal for the next frame after the delay signal, and outputs greater power conversion data. More specifically, comparison circuit 55 receives first power conversion data and second power conversion data, and outputs a greater one of the first power conversion data and the second power conversion data. Here, the first power conversion data is power consumption of the pixels corresponding to a first signal that includes the delay signal for at least one horizontal period, and the second power conversion data is power consumption of the pixels corresponding to a second signal that includes the video signal for at least one horizontal period that is one frame after the first signal. In the present embodiment, the first signal includes a delay signal for one horizontal period, and the second signal includes a video signal for one horizontal period that is one frame after the first signal. Note that the first signal may include a delay signal for two horizontal periods or more, and the second signal may include a video signal for two horizontal periods or more. Further, the first power conversion data is power conversion data calculated by horizontal period data calculation circuit 54 based on the first signal, and the second power conversion data is power conversion data calculated by horizontal period data calculation circuit 52 based on the second signal.

Display screen data storage 56 stores power conversion data for at least one frame. In the present embodiment, display screen data storage 56 receives power conversion data output by comparison circuit 55, and display screen data storage 56 stores power conversion data for one frame.

Gain calculation circuit 57 calculates a gain by which the delay signal is to be multiplied, based on power conversion data stored in display screen data storage 56 and a control target power value. In the present embodiment, gain calculation circuit 57 calculates a display screen power value which is the power consumption of the pixels for one frame, based on the power conversion data stored in display screen data storage 56. In the present embodiment, gain calculation circuit 57 calculates a sum of horizontal period power conversion data for each of the horizontal lines stored in display screen data storage 56 as the display screen power value. In other words, gain calculation circuit 57 calculates a display screen power value by adding up outputs of comparison circuit 55 for one frame, and calculates a gain based on the display screen power value.

The gain calculated by gain calculation circuit 57 is less than 1 when the display screen power value is greater than the control target power value. More specifically, when the display screen power value is greater than the control target power value, the gain calculated by gain calculation circuit 57 is less than or equal to a value obtained by dividing the control target power value by the display screen power value. In the present embodiment, when the display screen power value is greater than the control target power value, the gain is a value obtained by dividing the control target power value by the display screen power value. When the display screen power value is not greater than the control target power value, gain calculation circuit 57 sets the gain to 1. In the present embodiment, when the display screen power value is greater than the control target power value, gain calculation circuit 57 calculates the gain by dividing the control target power value by the display screen power value. Note that a method for setting the gain is not limited to the foregoing method. For example, gain calculation circuit 57 may have a look-up table showing a relationship between a gain and a value corresponding to a display screen power value, and may set a gain corresponding to a display screen power value based on the look-up table.

Gain multiplication circuit 44 is a circuit which multiplies a delay signal by a gain. Gain multiplication circuit 44 multiplies the delay signal by the gain calculated in gain calculation circuit 57. In the present embodiment, as illustrated in FIG. 5, each of the R, G, and B signals included in the delay signal is multiplied by the gain. In this way, when the display screen power value is greater than the control target power value, since the delay signal is multiplied by a gain that is less than 1, the luminance of the delay signal can be reduced. Accordingly, a current to be supplied to the pixels of display panel 60 is limited.

Figure 7:
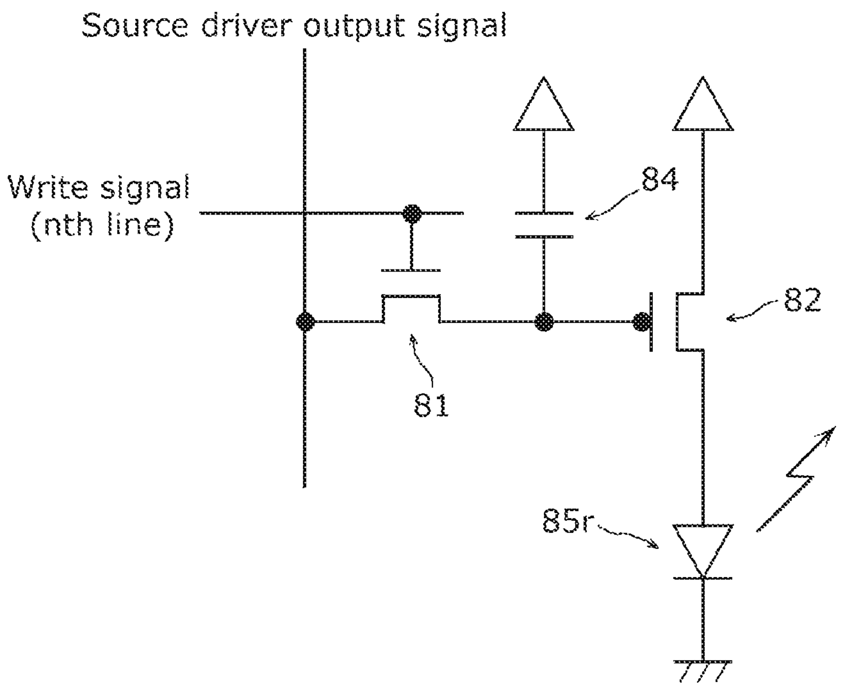
FIG. 7 is a circuit diagram illustrating one example of a configuration of a sub-pixel included in a pixel according to Embodiment 1.

The pixels included in display panel 60 are described with reference to FIG. 7. FIG. 7 is a circuit diagram illustrating one example of a configuration of a sub-pixel included in a pixel according to the present embodiment. FIG. 7 illustrates a sub-pixel which includes an organic EL element as a self luminous element. Each pixel according to the present embodiment includes three sub-pixels each corresponding to a different one of three colors of R, G, and B. The sub-pixel illustrated in FIG. 7 is a sub-pixel for emitting red (R) light. Note that a sub-pixel for emitting green light and a sub-pixel for emitting blue light have the same circuit configurations as that of the circuit illustrated in FIG. 7.

As illustrated in FIG. 7, the sub-pixel includes thin-film transistor (TFT) 81, capacitor 84, TFT 82, and self luminous element **85*r***.

TFT 81 has one end to which a data signal that is an output signal of source driver 68 is input. Capacitor 84 is connected to TFT 81. TFT 82 has a control terminal connected to a connection point between TFT 81 and capacitor 84. Self luminous element **85*r* is connected to TFT 82**.

TFT 81 switches ON and OFF based on a write signal which is a control signal output by shift register for writing 64. When TFT 81 is switched ON by a write signal in one horizontal period, capacitor 84 holds a data signal which is a source driver output signal corresponding to the signal level to be written to a pixel.

After the write signal is switched OFF, a current corresponding to a voltage held in capacitor 84 flows to TFT 82, and self luminous element **85*r*** lights up.

[1-2. Operations of Current Limiting Circuit and Current Limiting Method]

Operations of current limiting circuit 40 and a current limiting method are described.

Figure 8:
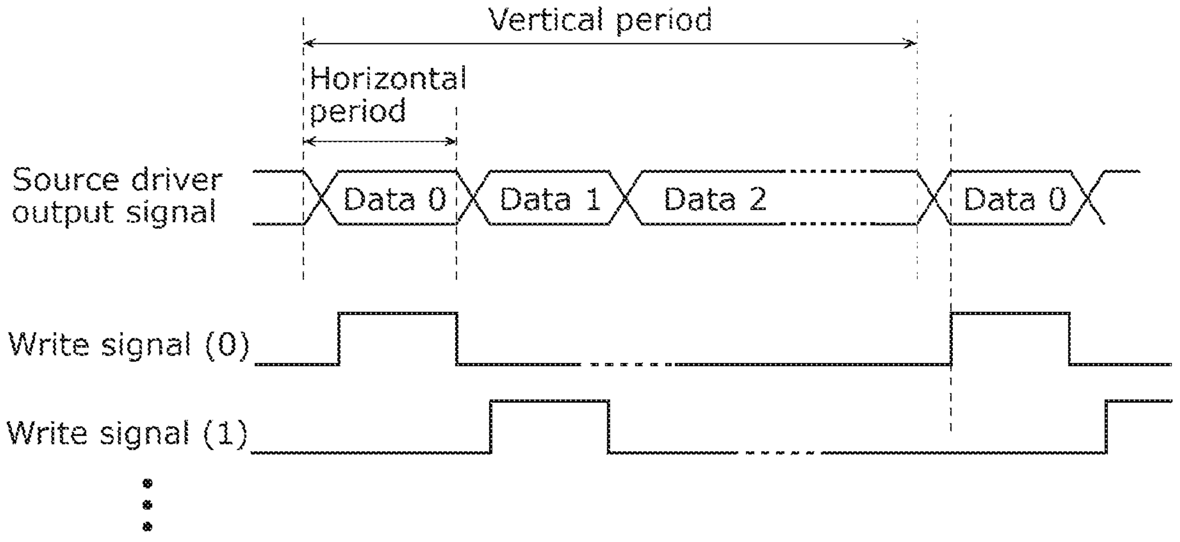
FIG. 8 is a diagram illustrating one example of a write signal to be input to a sub-pixel according to Embodiment 1.

First, prior to describing operations of current limiting circuit 40 and so on, a signal to be input to the sub-pixel illustrated in FIG. 7 is described with reference to FIG. 8. FIG. 8 is a diagram illustrating one example of a write signal to be input to the sub-pixel according to the present embodiment. Display device 10 writes, to display unit 70 by means of a write signal, a data signal which is output by source driver 68 for each horizontal period, and emits light in units of horizontal lines (hereinafter, also simply referred to as "lines"). Display device 10 repeats such operations for each vertical period.

Figure 9:
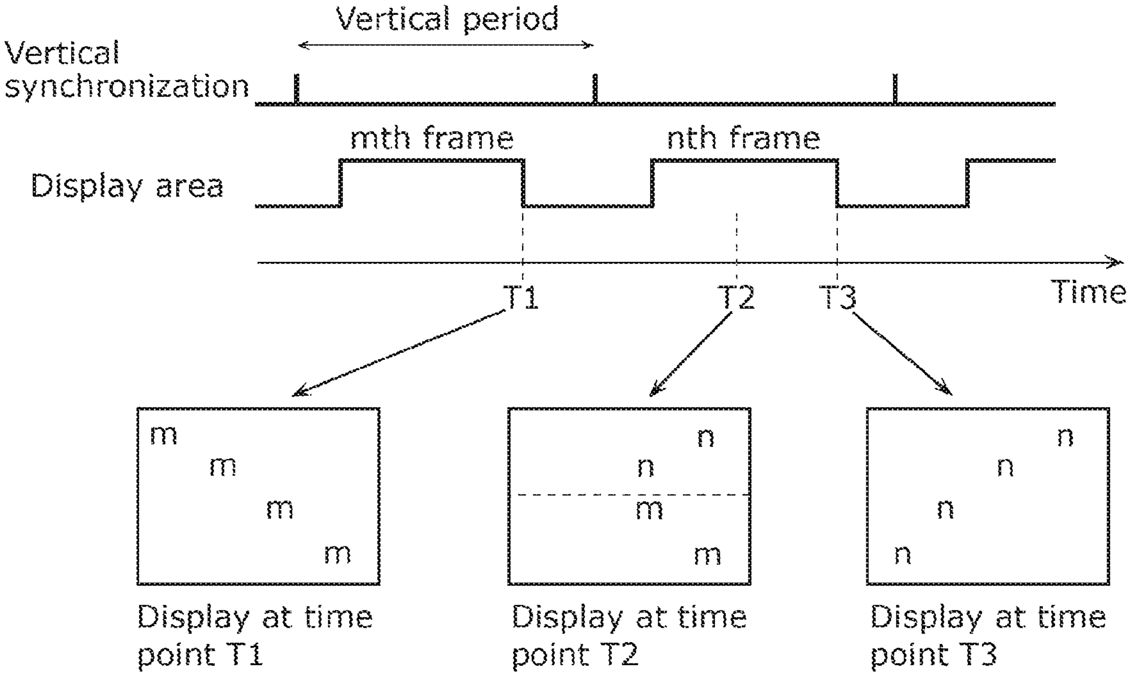
FIG. 9 is a schematic diagram illustrating transitions of the display state of a display unit according to Embodiment 1.

Next, transitions of the display state of display unit 70 are described with reference to FIG. 9. FIG. 9 is a schematic diagram illustrating transitions of the display state of display unit 70 according to the present embodiment. In FIG. 9, what is displayed on the display screen changes from the display at time point T1 to the display at time point T2, and from the display at time point T2 to the display at time point T3. A display screen of an mth frame is displayed at time point T1 corresponding to the end of the mth frame illustrated in FIG. 9. Here, shift register for writing 64 that outputs a write signal which is a control signal for writing a data signal to each pixel outputs a write signal so that scanning is performed from the top to the bottom of the display screen starting at the beginning of the display area of display unit 70. For this reason, at time point T2 corresponding to the middle of an nth frame following the mth frame (that is, the nth frame is an (m+1)th frame), the upper half of the display screen changes to the nth frame, and the lower half does not change from the mth frame. At time point T3 corresponding to the end of the nth frame, the bottom of the display area is scanned and the entire display screen shows the nth frame.

Figure 10:
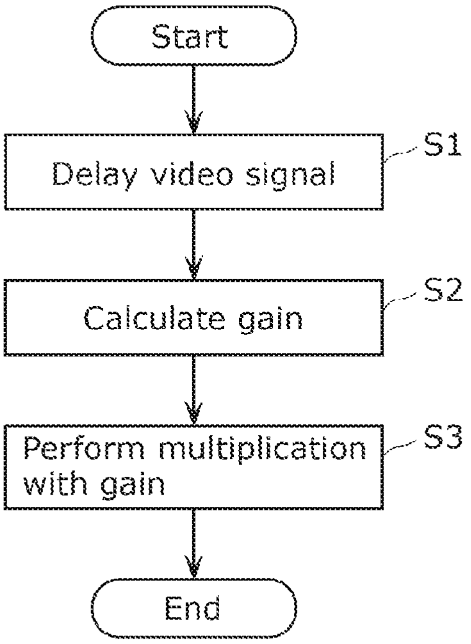
FIG. 10 is a flow chart illustrating a current limiting method according to Embodiment 1.

Next, operations of current limiting circuit 40 and a current limiting method according to the present embodiment are described with reference to FIG. 10. FIG. 10 is a flow chart illustrating a current limiting method according to the present embodiment.

As illustrated in FIG. 10, first, delay circuit 42 of current limiting circuit 40 delays a video signal by one frame time period (S1: delaying of a video signal).

Next, gain calculation circuit 57 of current limiting circuit 40 calculates a gain by which the delay signal is to be multiplied (S2: calculating of a gain). The calculating of a gain (S2) is described below.

Figure 11:
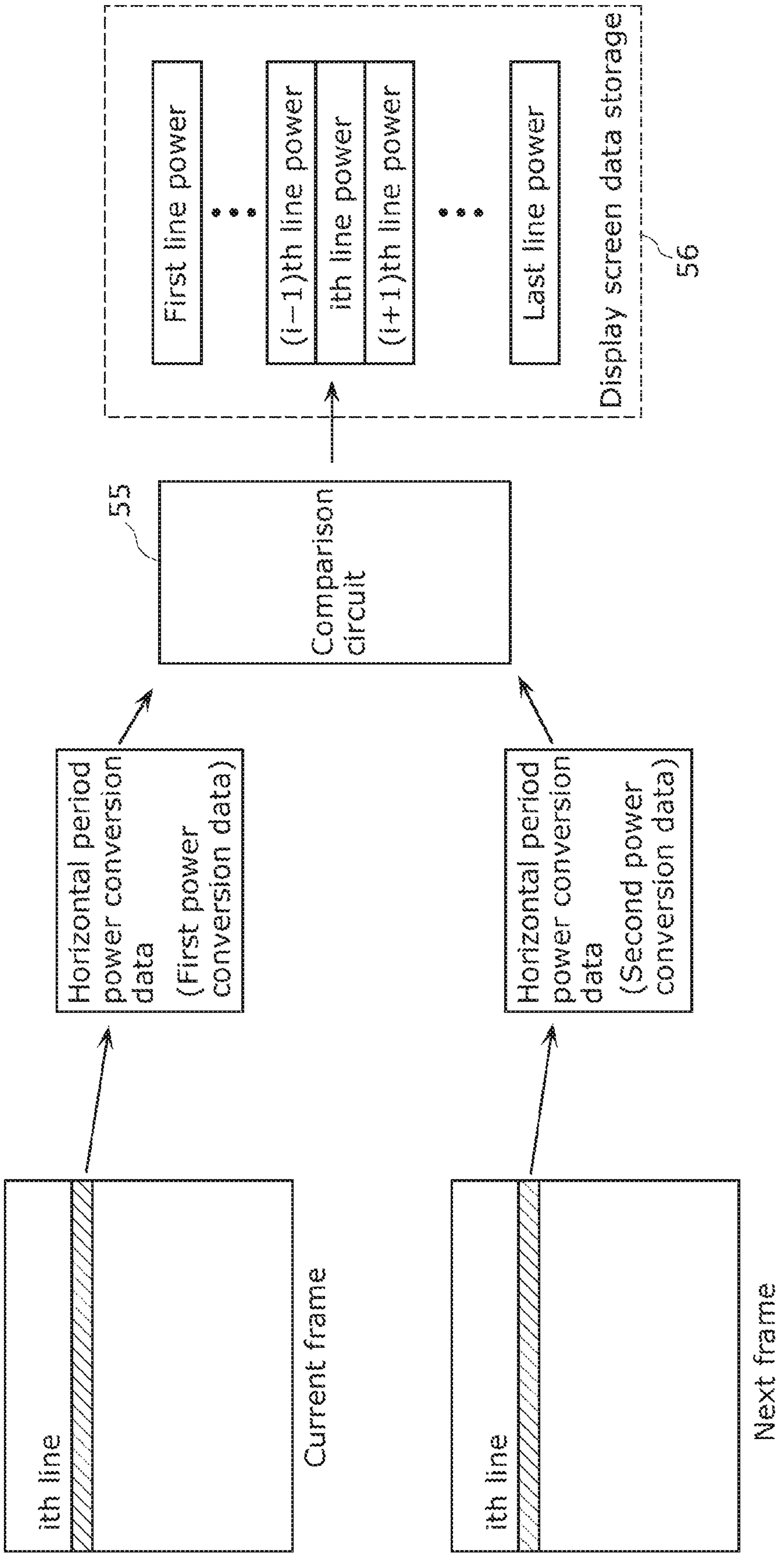
FIG. 11 is a schematic diagram illustrating a configuration of a display screen data storage according to Embodiment 1.

The configuration of display screen data storage 56 that stores power conversion data which gain calculation circuit 57 uses for calculating a gain is described with reference to FIG. 11. FIG. 11 is a schematic diagram illustrating a configuration of display screen data storage 56 according to the present embodiment. As illustrated in FIG. 11, display screen data storage 56 stores power conversion data output from comparison circuit 55. In the present embodiment, comparison circuit 55 receives, as first power conversion data, horizontal period power conversion data of an ith line of a current frame from horizontal period data calculation circuit 54 (see FIG. 2). Here, a video signal of the current frame corresponds to a delay signal that is output from delay circuit 42 illustrated in FIG. 2 and is received by weighted averaging circuit 53. Further, comparison circuit 55 receives, as second power conversion data, horizontal period power conversion data of the ith line of the next frame after the current frame from horizontal period data calculation circuit 52 (see FIG. 2). Here, a video signal of the next frame corresponds to a video signal received by weighted averaging circuit 51 illustrated in FIG. 2. Comparison circuit 55 outputs a greater one of the first power conversion data and second power conversion data to display screen data storage 56.

The power conversion data that is the greater one of the first power conversion data and second power conversion data which was output from comparison circuit 55 is stored in display screen data storage 56 as the power value of the ith line. When rewriting of the next frame is started, display screen data storage 56 newly rewrites the power values to be stored, in order from the first line.

Figure 12:
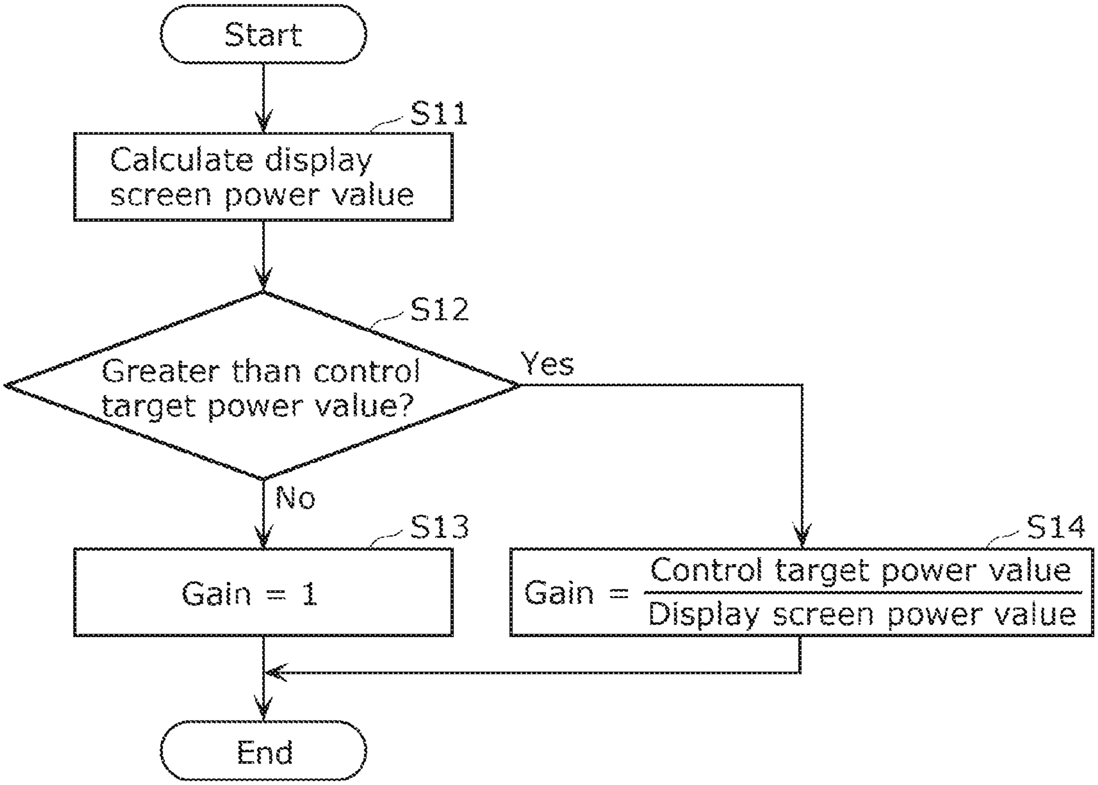
FIG. 12 is a flow chart illustrating a gain calculation method performed by a gain calculation circuit according to Embodiment 1.

Next, a calculation process performed by gain calculation circuit 57 is described with reference to FIG. 12. FIG. 12 is a flow chart illustrating a gain calculation method performed by gain calculation circuit 57 according to the present embodiment.

As illustrated in FIG. 12, first, gain calculation circuit 57 calculates a display screen power value based on the horizontal period power conversion data stored in display screen data storage 56 (S11). Specifically, a sum of horizontal period power conversion data for each of the horizontal lines stored in display screen data storage 56 is calculated as the display screen power value.

Next, gain calculation circuit 57 determines whether the calculated display screen power value is greater than a control target power value that is determined in advance (S12). When the display screen power value is not greater than the control target power value, the gain is set to 1 (S13). When the display screen power value is greater than the control target power value, the ratio of the control target power value to the display screen power value is calculated as a gain less than 1 (S14).

The gain is calculated in the above manner.

Referring back to FIG. 10, gain multiplication circuit 44 included in current limiting circuit 40 multiplies the delay signal by the gain (S3). Gain multiplication circuit 44 multiplies the delay signal received from delay circuit 42, by the gain received from gain calculation circuit 57. In the present embodiment, gain multiplication circuit 44 multiplies each of the R signal, G signal, and B signal included in the video signal, by the gain. By gain multiplication circuit 44 multiplying the delay signal by the gain in this way, when the display screen power value is greater than the control target power value, a current to be supplied to the pixels of display unit 70 is limited.

[1-3. Advantageous Effects]

Figure 13:
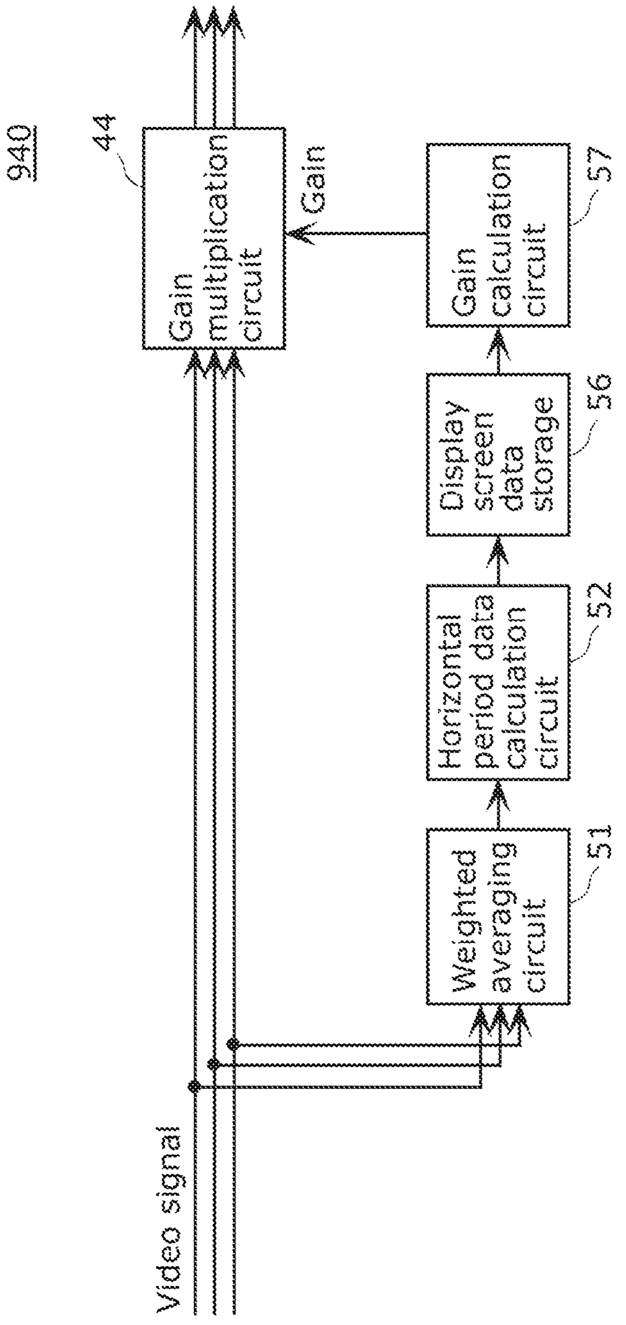
PRIOR ART FIG. 13
FIG. 13 is a block diagram illustrating a functional configuration of a current limiting circuit included in a display device according to Comparative Example 2.

Next, advantageous effects of display device 10 according to the present embodiment are described in comparison with display devices according to comparative examples. Here, a display device which has the same configuration as display device 10 according to the present embodiment except that the display device does not include a current limiting circuit is used as a display device according to Comparative Example 1. Further, a display device which has the same configuration as display device 10 according to the present embodiment except that the display device includes a current limiting circuit according to the conventional technology is used as a display device according to Comparative Example 2. A current limiting circuit included in the display device according to Comparative Example 2 is described with reference to FIG. 13. FIG. 13 is a block diagram illustrating a functional configuration of current limiting circuit 940 included in the display device according to Comparative Example 2. As illustrated in FIG. 13, current limiting circuit 940 according to Comparative Example 2 includes weighted averaging circuit 51, horizontal period data calculation circuit 52, display screen data storage 56, gain calculation circuit 57, and gain multiplication circuit 44. Weighted averaging circuit 51, horizontal period data calculation circuit 52, display screen data storage 56, gain calculation circuit 57, and gain multiplication circuit 44 included in current limiting circuit 940 according to Comparative Example 2 have the same configurations as those of weighted averaging circuit 51, horizontal period data calculation circuit 52, display screen data storage 56, gain calculation circuit 57, and gain multiplication circuit 44 included in current limiting circuit 40 according to the present embodiment.

Figure 14:
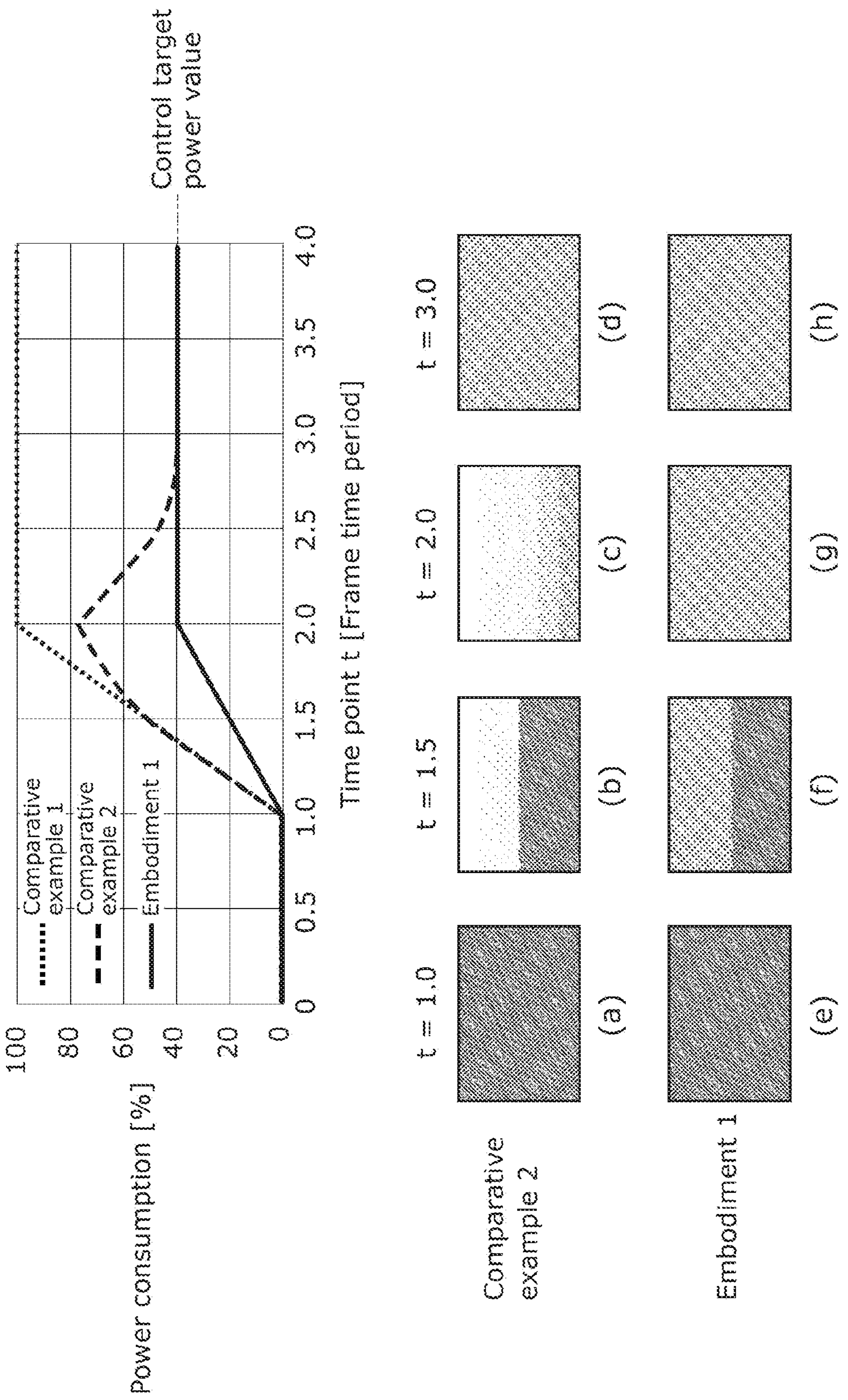
FIG. 14 is a graph illustrating temporal waveforms of power consumption of pixels when all-black display is changed to all-white display in display devices according to Comparative Example 1, Comparative Example 2, and Embodiment 1.
Figure 15:
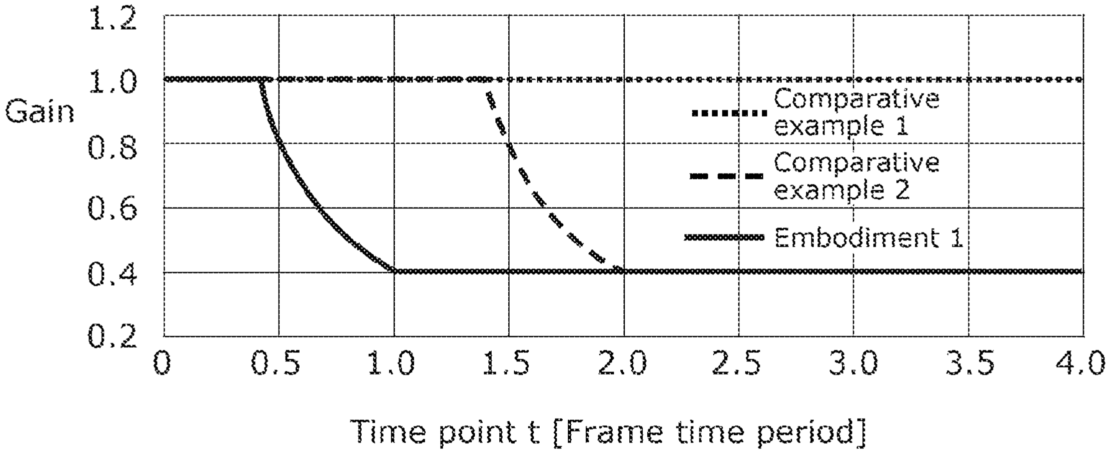
FIG. 15 is a graph illustrating temporal waveforms of a gain when all-black display is changed to all-white display in the display devices according to Comparative Example 1, Comparative Example 2, and Embodiment 1.

Next, power consumption of pixels of display unit 70 and a gain which calculation circuit 50 calculates are described with reference to FIG. 14 and FIG. 15 respectively. FIG. 14 is a graph illustrating temporal waveforms of power consumption of the pixels when all-black display is changed to all-white display in the display devices according to Comparative Example 1, Comparative Example 2, and the present embodiment. In the example illustrated in FIG. 14, after display unit 70 is changed from all-black display to all-white display (that is, an all-pixel white display with maximum luminance), the all-white display is maintained. In FIG. 14, images (a) to (d) displayed at respective time points on display unit 70 according to Comparative Example 2, and images (e) to (h) displayed at the respective time points on display unit 70 according to the present embodiment are shown together. FIG. 15 is a graph illustrating temporal waveforms of a gain when all-black display is changed to all-white display in the display devices according to Comparative Example 1, Comparative Example 2, and the present embodiment.

As illustrated in images (a) and (e) in FIG. 14, at a time point t=1.0 [frame time period] in the graph in FIG. 14, display unit 70 of each display device is in an all-black display state. In this case, a current to be supplied to the pixels in each display unit 70 is approximately zero. Subsequently, when a video signal representing all-white display is input to each display device, switching from black display to white display is performed in order from the top-end line of display unit 70 for each horizontal period of display unit 70. Here, in the display device according to Comparative Example 1, switching to white display is performed in accordance with the video signal input to the display device in all of the lines. That is, as illustrated in FIG. 15, the display device according to Comparative Example 1 corresponds to a display device in which a gain that a video signal is to be multiplied by is always 1.

In the display device according to Comparative Example 1, from the time point t=1.0 onward, switching from black display to white display with the maximum luminance is performed in order from the top-end line of display unit 70. Accompanying this, as illustrated in the graph in FIG. 14, the power consumption gradually increases from 0%, and becomes 100% at a time point t=2.0.

In the display device according to Comparative Example 2, when switching from black display to white display is performed in order from the top-end line of display unit 70 from the time point t=1.0 onward, switching to white display with the maximum luminance is performed in accordance with the video signal in the lines near the top end. In this case, as illustrated in the graph in FIG. 14, the power consumption exceeds a control target power value while switching to white display is being performed (see the vicinity of a time point t=1.4 in the graph in FIG. 14). In the example illustrated in FIG. 14, the control target power value is 40% of the power consumption in a case where white display is performed with maximum luminance in the entire display screen. When the power consumption of the pixels exceeds the control target power value in this way, as illustrated in FIG. 15, current limiting circuit 940 according to Comparative Example 2 multiplies the video signal by a gain that is less than 1. In this way, the current to be supplied to the pixels is limited.

For example, at a time point t=1.5 in FIG. 14, the lines located in the upper half region of display unit 70 are switched from black display to white display. In the display device according to Comparative Example 2, in this state, as illustrated in image (b) in FIG. 14, the luminance of the video signal is reduced by the current limiting circuit, and thus the luminance of the white display decreases progressively from the top-end line toward the lower lines. Specifically, although the top-end line of display unit 70 represents white display in accordance with the video signal, a line located at the lowermost position among the lines representing white display in image (b) in FIG. 14 (that is, a line located at the middle in the vertical direction of display unit 70) represents white display with a luminance lower than the luminance represented by the video signal (that is, gray display). Thereafter, the pixels disposed in the lines in the lower half of display unit 70 also represent white display with a luminance lower than the luminance represented by the video signal. In this way, at the time point t=2.0, as illustrated in image (c) in FIG. 14, display unit 70 represents all-white display in which the luminance decreases progressively toward the bottom end of display unit 70. At the time point t=2.0, the lines near the top end of display unit 70 represent white display with a luminance in accordance with the video signal, and thus the power consumption of the pixels exceeds the control target power value by a large margin.

The current to be supplied to the pixels is also limited by current limiting circuit 40 during the one frame time period from the time point t=2.0. By this means, at a time point t=3.0 after the elapse of one vertical period from the time point t=2.0, all lines represent all-white display with a luminance lower than the luminance represented by the video signal. In this way, power consumption of the pixels from the time point t=3.0 onward is limited to the control target power value or less.

As described above, in the display device according to Comparative Example 2, the power consumption of the pixels may temporarily exceed the control target power value by a large margin.

Next, as illustrated in image (e) in FIG. 14, display unit 70 of display device 10 according to the present embodiment is in an all-black display state at the time point t=1.0 in the graph in FIG. 14. When a delay signal for one frame to be input to display panel 60 represents all-black display, display unit 70 becomes all black. When a video signal for one frame that follows the delay signal for one frame representing all-black display is a video signal representing all-white display, comparison circuit 55 of current limiting circuit 40 illustrated in FIG. 2 receives first power conversion data corresponding to the delay signal for one frame representing all-black display, and second power conversion data corresponding to the video signal for one frame representing all-white display. In this case, since the second power conversion data is greater than the first power conversion data, comparison circuit 55 outputs the second power conversion data to display screen data storage 56. For this reason, at the time point t=1.0 at which switching from all-black display to all-white display starts, power corresponding to all-white display is input for each line power of display screen data storage 56. Accompanying this, gain calculation circuit 57 calculates a power value corresponding to all-white display as a display screen power value, and calculates a gain corresponding to the relevant display screen power value. In the example illustrated in FIG. 14, gain calculation circuit 57 calculates the gain as 40%/100%=0.4. Therefore, as illustrated in FIG. 15, from the time point t=1.0 onward, gain multiplication circuit 44 multiplies an R signal, a G signal, and a B signal included in a delay signal for one frame representing all-white display by 0.4 as the gain. In this way, as illustrated in image (f) in FIG. 14, from the time point t=1.0 onward, switching to white display with a luminance lower than a luminance corresponding to all-white display is performed from the top-end line of display unit 70. Note that, as illustrated in FIG. 15, the gain becomes less than 1 at a time point (t=about 0.4) prior to the time point (t=1.0) at which switching from black display to white display starts in order from the top-end line of display unit 70, and from that time point t=approximately 0.4 onward the gain gradually decreases until the time point t=1.0.

From the time point t=2.0 onward, as illustrated in images (g) and (h) in FIG. 14, the entire display unit 70 is switched to white display with a low luminance. Therefore, the power consumption of the pixels is always limited to the control target power value or less.

As described above, in display device 10 and the current limiting method according to the present embodiment, a gain by which to multiply a delay signal is calculated based on power consumption of pixels corresponding to the delay signal and power consumption of pixels corresponding to a video signal. By this means, in display device 10 and the current limiting method according to the present embodiment, power consumption (that is, a current) of display panel 60 can be reduced more than in the display devices according to the comparative examples even when a luminance represented by a video signal abruptly increases. Further, in display device 10, power consumption of the pixels of display panel 60 can be reduced to the control target power value or less.

Embodiment 2

Figure 16:
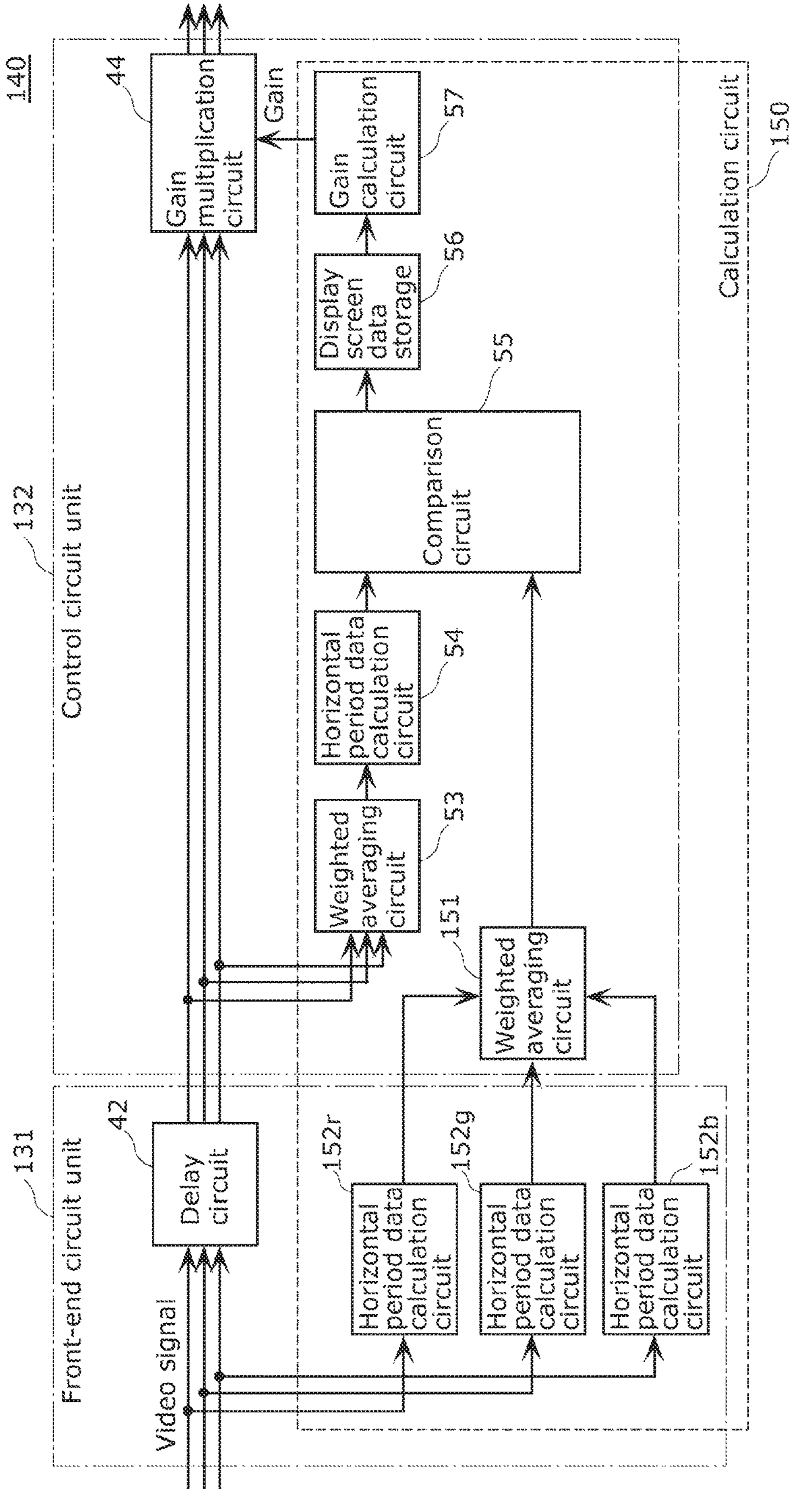
FIG. 16 is a block diagram illustrating a functional configuration and a form of integration of a current limiting circuit according to Embodiment 2.

A current limiting circuit and the like according to Embodiment 2 are described. A current limiting circuit according to the present embodiment differs from current limiting circuit 40 according to Embodiment 1 with respect to a configuration pertaining to calculation of second power conversion data. With reference to FIG. 16, the current limiting circuit according to the present embodiment is described below centering on differences from current limiting circuit 40 according to Embodiment 1.

FIG. 16 is a block diagram illustrating the functional configuration and the form of integration of current limiting circuit 140 according to the present embodiment. As illustrated in FIG. 16, current limiting circuit 140 includes delay circuit 42, gain multiplication circuit 44, and calculation circuit 150. Calculation circuit 150 includes weighted averaging circuits 151 and 53, horizontal period data calculation circuits 152*r*, 152*g*, 152*b*, and 54, comparison circuit 55, display screen data storage 56, and gain calculation circuit 57.

Horizontal period data calculation circuits 152*r*, 152*g*, and 152*b* calculate horizontal period power conversion data corresponding to display data for each horizontal period. Horizontal period data calculation circuits 152*r*, 152*g*, and 152*b* calculate an integrated value or an average value of R signals, G signals, and B signals included in a video signal in a horizontal period, respectively. In the present embodiment, horizontal period data calculation circuits 152*r*, 152*g*, and 152*b* perform calculations based on R signals, G signals, and B signals which are not multiplied by a weighting coefficient, respectively.

Weighted averaging circuit 151 is a circuit that calculates a weighted average of pixel values included in a video signal. In the present embodiment, weighted averaging circuit 151 calculates a weighted average of integrated values of pixel values of each of an R signal, a G signal, and a B signal which are input from horizontal period data calculation circuits 152*r*, 152*g*, and 152*b*, and outputs the calculated weighted averages as second power conversion data to comparison circuit 55.

As described above, in current limiting circuit 140 according to the present embodiment, in the calculation of the second power conversion data, the order in which integration of horizontal period data and calculation of weighted averages are performed is different from the order in current limiting circuit 40 according to Embodiment 1. In current limiting circuit 140 configured in this manner, when a weighting coefficient used in weighted averaging circuits 151 and 53 is a constant (in other words, when a weighting coefficient is not a function that changes according to pixel values or the like), the same advantageous effects as the advantageous effects provided by current limiting circuit 40 according to Embodiment 1 are provided.

Further, as illustrated in FIG. 16, current limiting circuit 140 includes two integrated circuit units, namely, front end circuit unit 131 and control circuit unit 132. Front end circuit unit 131 includes delay circuit 42, and horizontal period data calculation circuits 152*r*, 152*g*, and 152*b*. Control circuit unit 132 includes weighted averaging circuits 151 and 53, horizontal period data calculation circuit 54, comparison circuit 55, display screen data storage 56, gain calculation circuit 57, and gain multiplication circuit 44.

Because front end circuit unit 131 includes delay circuit 42 and horizontal period data calculation circuits 152*r*, 152*g*, and 152*b* in this way, the circuit configuration of control circuit unit 132 can be simplified. In particular, in a case where control circuit unit 132 is included in a TCON chip, the configuration of the TCON chip can be simplified.

Further, because weighted averaging circuit 151 and weighted averaging circuit 53 are integrated in control circuit unit 132, weighting coefficients can be shared by weighted averaging circuit 151 and weighted averaging circuit 53. Therefore, the storage capacity required by current limiting circuit 140 can be reduced.

Note that, the form of integration of current limiting circuit 140 is not limited to the form illustrated in FIG. 16. For example, weighted averaging circuits 151 and 53 may be integrated in front end circuit unit 131.

Embodiment 3

A current limiting circuit and the like according to Embodiment 3 are described. A current limiting circuit according to the present embodiment differs from current limiting circuit 40 according to Embodiment 1 in configuration of the calculation circuit. The current limiting circuit according to the present embodiment is described below centering on differences from current limiting circuit 40 according to Embodiment 1.

[3-1. Configuration of Current Limiting Circuit]

Figure 17:
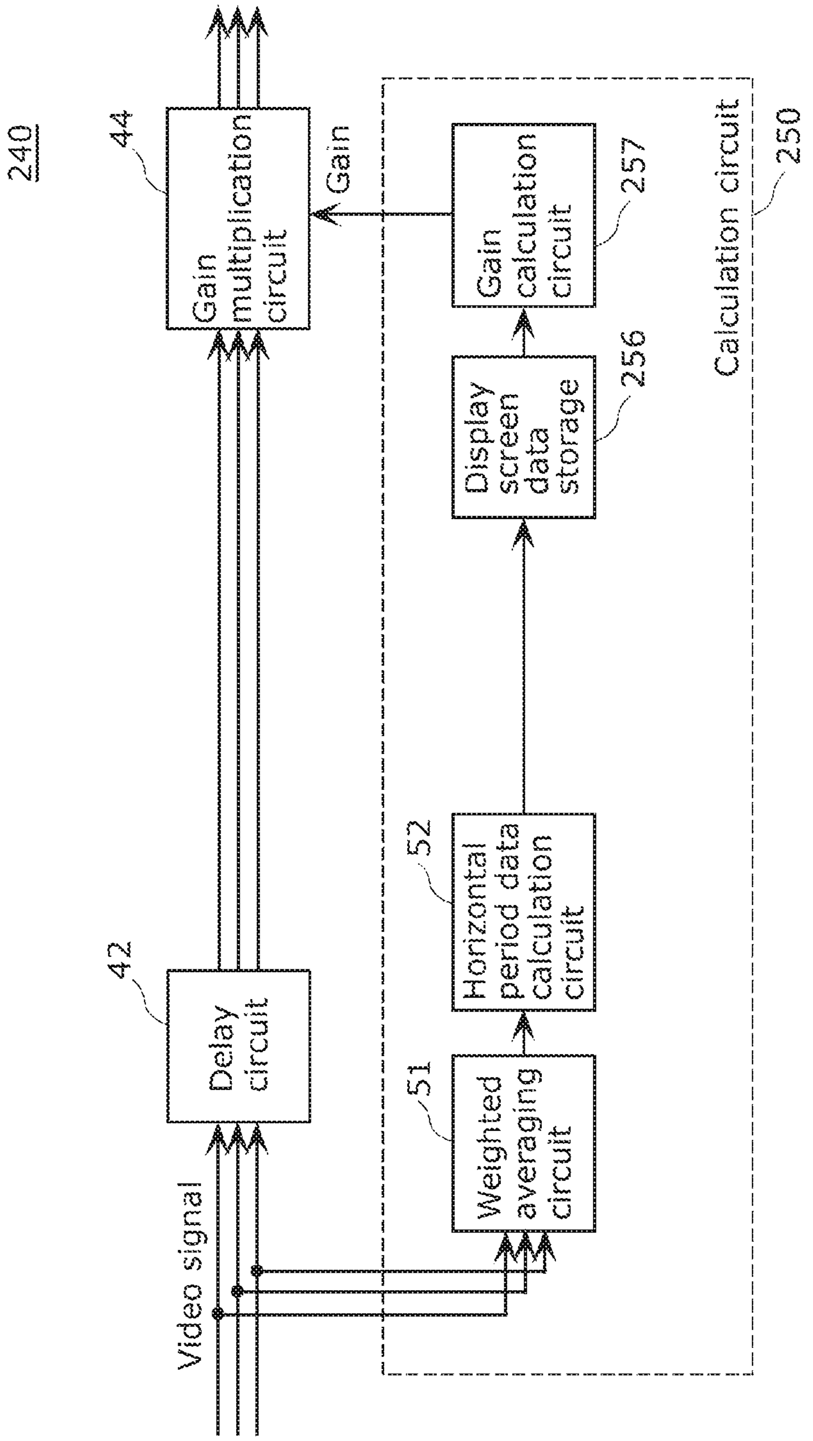
FIG. 17 is a block diagram illustrating a functional configuration of a current limiting circuit according to Embodiment 3.

A configuration of the current limiting circuit according to the present embodiment is described with reference to FIG. 17. FIG. 17 is a block diagram illustrating a functional configuration of current limiting circuit 240 according to the present embodiment. As illustrated in FIG. 17, current limiting circuit 240 includes delay circuit 42, gain multiplication circuit 44, and calculation circuit 250.

Calculation circuit 250 according to the present embodiment receives a video signal, and calculates a gain by which a delay signal is to be multiplied, based on power consumption of pixels corresponding to the video signal. More specifically, calculation circuit 250 calculates a gain, based on power consumption of pixels corresponding to a video signal for two continuous frames. Calculation circuit 250 calculates power values, and calculates the gain, based on a greatest power value among the power values calculated, the greatest power value being a display screen power value. In other words, in the present embodiment, the greatest value among the power values is used as the display screen power value. Here, each of the power values indicates power consumption of the pixels corresponding to the video signal for one continuous frame included in the video signal for two continuous frames. Note that, the video signal for two continuous frames corresponds to a combination of a delay signal for one frame, and a video signal for one frame that follows the delay signal. Therefore, it can also be said that calculation circuit 250 according to the present embodiment calculates a gain, based on the power consumption of pixels corresponding to a delay signal for one frame and the power consumption of pixels corresponding to a video signal for one frame.

The gain calculated by calculation circuit 250 is less than 1 when the display screen power value is greater than a control target power value. More specifically, when the display screen power value is greater than the control target power value, the gain is less than or equal to a value obtained by dividing the control target power value by the display screen power value. In the present embodiment, when the display screen power value is greater than the control target power value, the gain is a value obtained by dividing the control target power value by the display screen power value. Calculation circuit 250 calculates and outputs the gain for each period shorter than a vertical period of the video signal. In the present embodiment, calculation circuit 250 calculates and outputs the gain for each horizontal period. Calculation circuit 250 includes weighted averaging circuit 51, horizontal period data calculation circuit 52, display screen data storage 256, and gain calculation circuit 257.

Display screen data storage 256 according to the present embodiment stores power conversion data for two frames which horizontal period data calculation circuit 52 outputs. Specifically, display screen data storage 256 stores power conversion data corresponding to a delay signal for one frame, and power conversion data corresponding to a video signal for one frame that follows the delay signal for one frame. Display screen data storage 256 receives power conversion data that horizontal period data calculation circuit 52 outputs. When display screen data storage 256 receives the power conversion data from horizontal period data calculation circuit 52, display screen data storage 256 deletes power conversion data that was received two frames before the currently-received power conversion data.

Gain calculation circuit 257 calculates a gain by which the delay signal is to be multiplied, based on the power conversion data stored in display screen data storage 256 and a control target power value. In the present embodiment, gain calculation circuit 257 calculates a display screen power value that is the power consumption of the pixels for one frame, based on the power conversion data for two frames stored in display screen data storage 256.

Operations of current limiting circuit 240 and a current limiting method according to the present embodiment are described with reference to FIG. 10 which has been described earlier. As with the current limiting method according to Embodiment 1 shown in FIG. 10, the current limiting method according to the present embodiment also includes delaying of a video signal, calculating of a gain, and multiplying of the delay signal by the gain. The delaying of a video signal and the multiplying of the delay signal by the gain according to the present embodiment are the same as the delaying of a video signal and the multiplying of the delay signal by the gain according to Embodiment 1, respectively.

In the calculating of a gain in the current limiting method according to the present embodiment, a gain by which the delay signal is to be multiplied is calculated based on power consumption of the pixels corresponding to the video signal for two continuous frames. In the calculating of a gain, gain calculation circuit 257 calculates power values, and calculates a gain, based on a display screen power value that is the greatest power value among the power values calculated.

Figure 18:
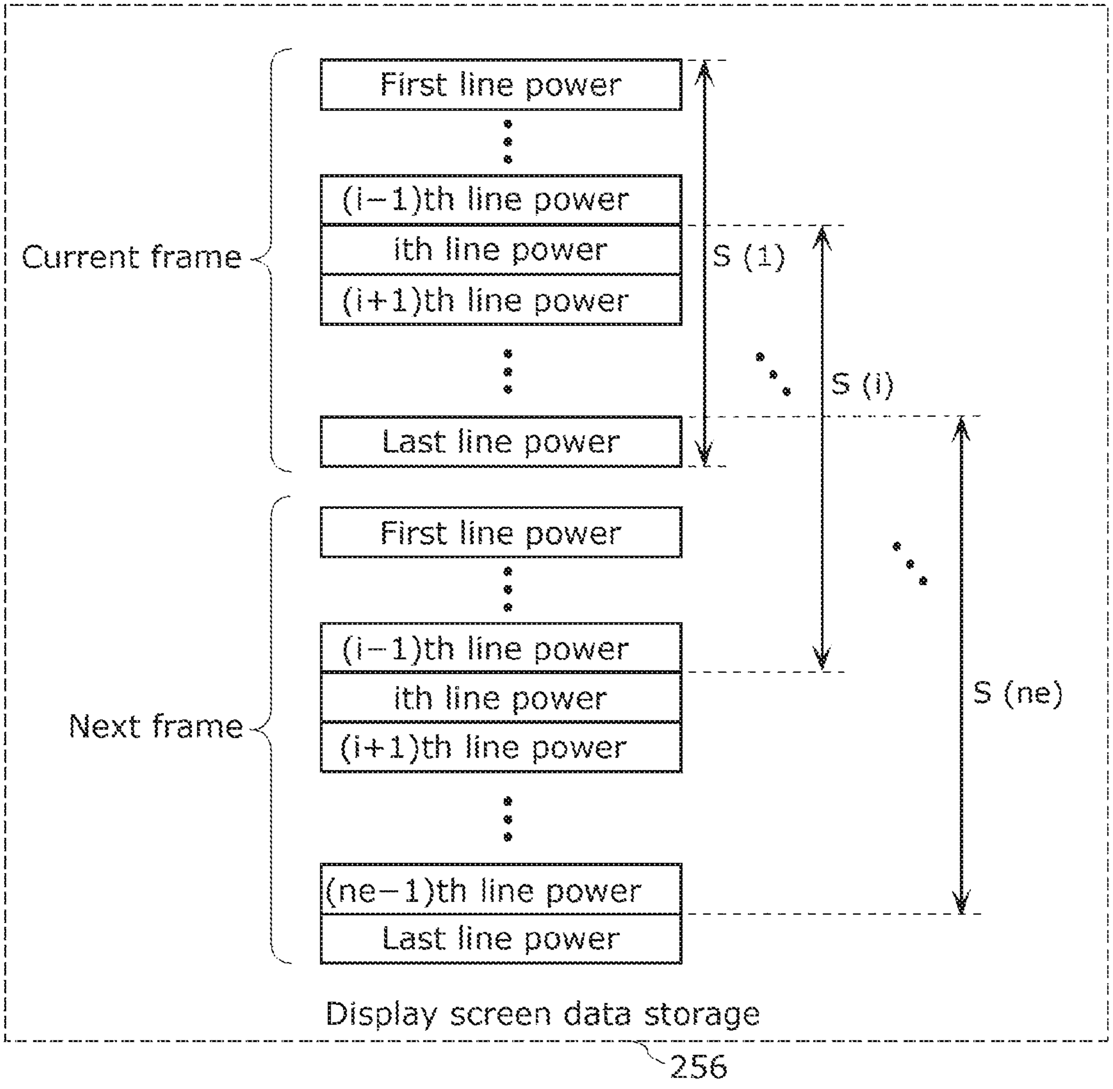
FIG. 18 is a diagram illustrating one example of a method for calculating a display screen power value according to Embodiment 3.
Figure 19:
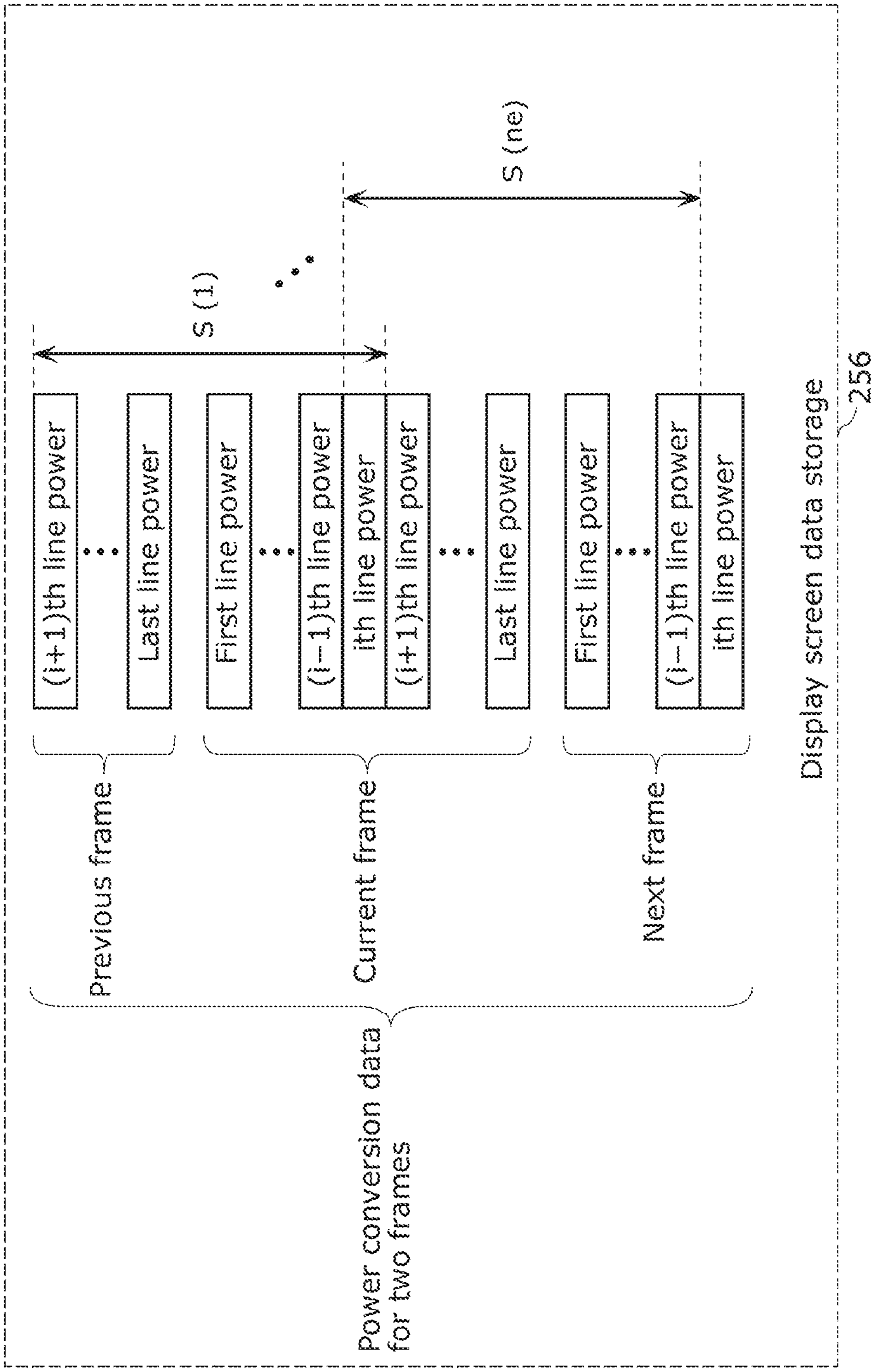
FIG. 19 is a diagram illustrating another example of a method for calculating a display screen power value according to Embodiment 3.

With reference to FIG. 18 and FIG. 19, a method for calculating a display screen power value performed by gain calculation circuit 257 according to the present embodiment is described. FIG. 18 and FIG. 19 are diagrams each illustrating one example of a method for calculating a display screen power value according to the present embodiment. FIG. 18 illustrates power conversion data stored in display screen data storage 256 at a timing at which a delay signal corresponding to the last line of the current frame is output from delay circuit 42. FIG. 19 illustrates power conversion data stored in display screen data storage 256 at a timing at which a delay signal corresponding to an ith line of the current frame is output from delay circuit 42. Note that, here, i represents an integer that is equal to or greater than 1 and is equal to or less than the number of lines in display unit 70.

In the present embodiment, display screen data storage 256 stores horizontal period power conversion data for each horizontal line on the display screen of display unit 70 that corresponds to a video signal for two frames. For example, the horizontal period power conversion data of the ith line of the current frame (mth frame) is stored in display screen data storage 256 as the power value of the ith line of the current frame. The horizontal period power conversion data of the ith line of the next frame (mth+one frame) following the current frame is stored in display screen data storage 256 as the power value of the ith line of the next frame. Each time horizontal period power conversion data of a new line is calculated, a power value that is stored by display screen data storage 256 is also newly rewritten. Display screen data storage 256 stores power conversion data that is received from horizontal period data calculation circuit 52, as a power value corresponding to a delay signal written onto the display screen of display unit 70, and as a power value corresponding to a video signal for one frame that follows the delay signal.

In the example illustrated in FIG. 18, display screen data storage 256 stores power conversion data corresponding to a video signal for two frames that consists of power conversion data corresponding to a video signal (for one frame) of the current frame and power conversion data corresponding to a video signal (for one frame) of the next frame. In the example illustrated in FIG. 19, display screen data storage 256 stores power conversion data corresponding to a video signal for two frames that consists of power conversion data corresponding to a video signal from the (i+1)th line to the last line of the previous frame, power conversion data corresponding to a video signal (for one frame) of the current frame, and power conversion data corresponding to a video signal from the first line to the ith line of the next frame.

Based on the power conversion data for two frames that display screen data storage 256 stores, gain calculation circuit 257 calculates a greatest value among power values corresponding to a signal written onto the display screen of display unit 70 and power values corresponding to a signal to be written onto the display screen of display unit 70 continuously within one frame time period, as a display screen power value.

Specifically, in the example illustrated in FIG. 18, gain calculation circuit 257 calculates power value S(1) obtained by adding up the values from the first line power to the last line power of the current frame, power value S(2) obtained by adding up the values from the second line power to the last line power of the current frame and the first line power of the next frame, . . . power value S(i) obtained by adding up the values from the ith line power to the last line power of the current frame and from the first line power to the (i−1)th line power of the next frame, . . . and power value S(ne) obtained by adding up the values from the current line of the current frame, that is, the last line power of the current frame to the (ne−1)th line power of the next frame. Here, ne represents the number of lines in display unit 70.

In the example illustrated in FIG. 19, gain calculation circuit 257 calculates power value S(1) obtained by adding up the values from the (i+1)th line power of the previous frame to the ith line power of the current frame, . . . and power value S(ne) obtained by adding up the values from the current line of the current frame, that is, the ith line power of the current frame to the (i−1)th line power of the next frame.

Next, gain calculation circuit 257 selects the greatest value among power values S(1) to S(ne) as the display screen power value.

Next, similarly to gain calculation circuit 57 according to Embodiment 1, if the display screen power value is greater than the control target power value, gain calculation circuit 257 calculates the ratio of the control target power value to the display screen power value as a gain. In this case, the gain is less than 1. If the display screen power value is not greater than the control target power value, gain calculation circuit 257 sets the gain to 1.

[3-2. Advantageous Effects]

Current limiting circuit 240 and a display device including current limiting circuit 240 according to the present embodiment provide the same advantageous effects as the advantageous effects provided by current limiting circuit 40 and display device 10 according to Embodiment 1. Additional advantageous effects of the display device including current limiting circuit 240 according to the present embodiment are described in comparison with a display device according to Comparative Example 1 and display device 10 according to Embodiment 1 with reference to FIG. 20 and FIG. 21.

Figure 20:
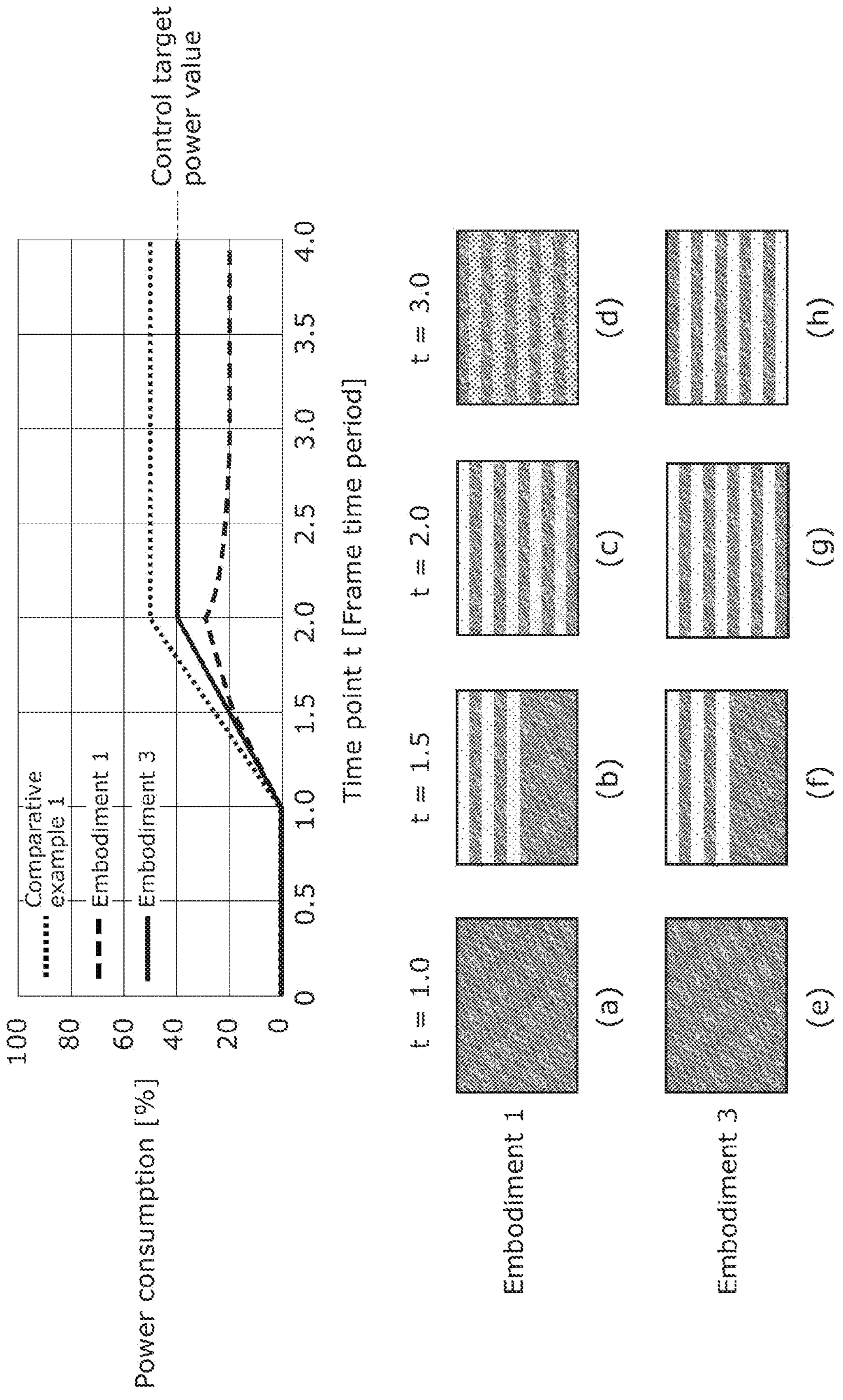
FIG. 20 is a graph illustrating temporal waveforms of power consumption by pixels when, in the display devices according to Comparative Example 1, Embodiment 1, and Embodiment 3, all-black display is changed to striped white display and black display, and then the striped white display and black display are inverted to striped black display and white display.
Figure 21:
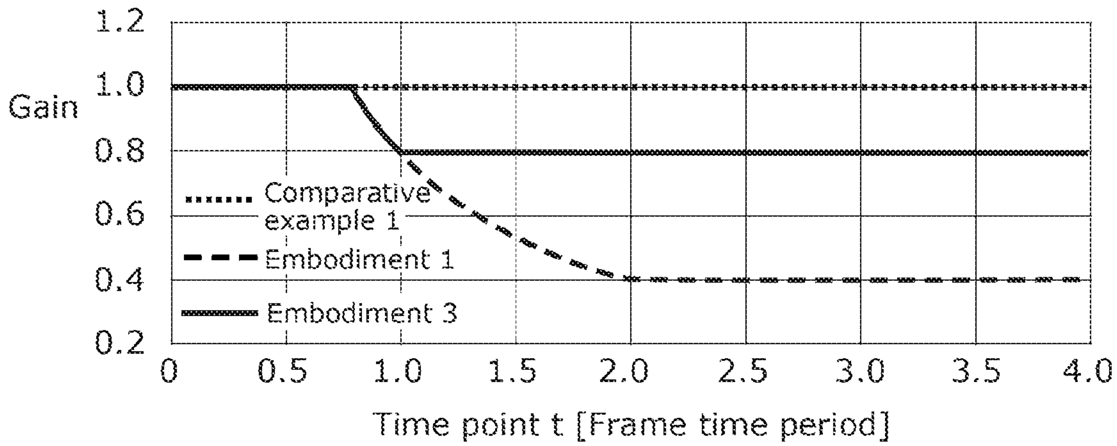
FIG. 21 is a graph illustrating temporal waveforms of a gain when, in the display devices according to Comparative Example 1, Embodiment 1, and Embodiment 3, all-black display is changed to striped white display and black display, and then the striped white display and black display are inverted to striped black display and white display.

FIG. 20 is a graph illustrating temporal waveforms of power consumption of pixels when, in the display devices according to Comparative Example 1, Embodiment 1, and the present embodiment, all-black display is changed to striped white display and black display, and then the striped white display and black display are inverted to striped black display and white display. Note that, after all-black display is changed to striped white display and black display in each display device, and then the striped white display and black display are inverted to striped black display and white display in each display device, inverting of white display and black display is repeated for each frame. Here, the striped white display is white display with the maximum luminance. In FIG. 20, images (a) to (d) displayed at respective time points on display unit 70 according to Embodiment 1, and images (e) to (h) displayed at the respective time points on display unit 70 according to the present embodiment are shown together. The display device according to Comparative Example 1 has the same configuration as the display device according to Comparative Example 1 used in the description of the advantageous effects of Embodiment 1. FIG. 21 is a graph illustrating temporal waveforms of a gain when, in the display devices according to Comparative Example 1, Embodiment 1, and the present embodiment, all-black display is changed to striped white display and black display, and then the striped white display and black display are inverted to striped black display and white display.

As illustrated in images (a) and (e) in FIG. 20, at a time point t=1.0 [frame time period] in the graph in FIG. 20, display unit 70 of each display device is in an all-black display state. In this case, a current to be supplied to the pixels in each display unit 70 is approximately zero. Subsequently, when a video signal representing striped white display and black display is input to each display device, switching to white display in stripes is performed from the top-end line of display unit 70 for each horizontal period of display unit 70.

Here, in display device 10 according to Comparative Example 1, switching to a striped display is performed in accordance with the video signal input to the display device in all of the lines. In the display device according to Comparative Example 1, from the time point t=1.0 onward, switching from black display to white display with the maximum luminance is performed in order from the top-end line of display unit 70. Accompanying this, as illustrated in the graph in FIG. 20, power consumption gradually increases from 0%, and becomes approximately 50% at a time point t=2.0. As illustrated in FIG. 21, the display device according to Comparative Example 1 corresponds to a display device in which a gain that a video signal is to be multiplied by is always 1.

As illustrated in image (a) in FIG. 20, display unit 70 of display device 10 according to Embodiment 1 is in an all-black display state at the time point t=1.0 in the graph in FIG. 20. When a video signal for one frame that follows a delay signal for one frame representing all-black display is a video signal representing striped white display and black display, comparison circuit 55 of current limiting circuit 40 illustrated in FIG. 2 receives first power conversion data corresponding to the delay signal for one frame representing all-black display, and second power conversion data corresponding to the video signal for one frame representing striped white display and black display. In this case, since the second power conversion data is greater than the first power conversion data, comparison circuit 55 outputs the second power conversion data to display screen data storage 56.

Therefore, at the time point t=1.0 at which switching from all-black display to striped white display and black display starts, a power value corresponding to a video signal for one frame representing striped white display and black display is input for each line power of display screen data storage 56. Accompanying this, gain calculation circuit 57 calculates a power value corresponding to a video signal for one frame representing striped white display and black display as a display screen power value, and calculates a gain corresponding to the relevant display screen power value. In the example illustrated in FIG. 20, gain calculation circuit 57 calculates the gain as 40%/50%=0.8. Therefore, as illustrated in FIG. 21, at the time point t=1.0, gain multiplication circuit 44 multiplies an R signal, a G signal, and a B signal included in a delay signal for one frame representing striped white display and black display by 0.8 as the gain.

At the time point t=1.0, a video signal for one frame that follows the delay signal for one frame representing striped white display and black display represents a display in which the striped white display and black display are inverted to striped black display and white display. In this case, comparison circuit 55 of current limiting circuit 40 illustrated in FIG. 2 receives first power conversion data corresponding to the delay signal for one frame representing striped white display and black display, and second power conversion data corresponding to the video signal for one frame representing striped black display and white display. Here, between the delay signal for one frame and the video signal for one frame, white display and black display are inverted. That is, in lines in which the delay signal for one frame represents white display, the video signal for one frame represents black display, and in lines in which the delay signal for one frame represents black display, the video signal for one frame represents white display. Therefore, in lines in which the delay signal for one frame represents white display, the first power conversion data is greater than the second power conversion data, and in lines in which the delay signal for one frame represents black display, the second power conversion data is greater than the first power conversion data. For this reason, in the period from the time point t=1.0 to the time point t=2.0, comparison circuit 55 always outputs power conversion data corresponding to white display to display screen data storage 56. Therefore, at the time point t=2.0, power values corresponding to white display in all lines are stored in display screen data storage 56. In this case, gain calculation circuit 57 calculates the gain as 40%/100%=0.4. That is, as illustrated in FIG. 21, in the period from the time point t=1.0 to the time point t=2.0, a gain that gain calculation circuit 57 calculates gradually decreases from 0.8 to 0.4. In this way, as illustrated in image (b) in FIG. 20, at a time point t=1.5, the upper half of display unit 70 is switched to striped white display and black display, and as illustrated in image (c) in FIG. 20, at the time point t=2.0, the entire display unit 70 is switched to striped white display and black display. In images (b) and (c), the luminance in a white display region is lower than the luminance of white display represented by the delay signal, and the luminance of white display decreases progressively from the top end toward the bottom end.

From the time point t=2.0 onward, power values corresponding to white display in all lines are always stored in display screen data storage 56, similarly to the time point t=2.0. For this reason, a gain with respect to a delay signal of a line for which display is to be switched from the time point t=2.0 onward is 0.4, similarly to the time point t=2.0. Therefore, as illustrated in FIG. 21, at a time point t=3.0 after the elapse of one frame time period from the time point t=2.0, a delay signal corresponding to all lines of display unit 70 is multiplied by a gain of 0.4. For this reason, as illustrated in image (d) in FIG. 20, the luminance of a white display region is reduced by a large margin from the maximum luminance. In the example illustrated in FIG. 20, the power consumption of the pixels at the time point t=3.0 is reduced to about half (20%) of the control target power value.

Thus, in display device 10 according to Embodiment 1, there may be cases where the power consumption is reduced more than necessary.

On the other hand, as illustrated in image (e) in FIG. 20, the display device including current limiting circuit 240 according to the present embodiment enters an all-black display state at the time point t=1.0 in the graph in FIG. 20, similarly to display device 10 according to Embodiment 1. In a case where a video signal that follows a delay signal representing all-black display is a video signal representing striped white display and black display, at the time point t=1.0, power conversion data corresponding to a delay signal for one frame representing all-black display, and power conversion data corresponding to a video signal for one frame representing striped white display and black display are stored in display screen data storage 256 of current limiting circuit 40 illustrated in FIG. 17.

Gain calculation circuit 257 calculates power values S(1) to S(ne) based on the power conversion data stored in display screen data storage 256, and selects the greatest value among power values S(1) to S(ne) as a display screen power value. In the example illustrated in FIG. 20, the greatest value among power values S(1) to S(ne) is a power value S(ne)≈50% that corresponds to striped white display and black display. Therefore, gain calculation circuit 257 calculates the gain as 40%/50%=0.8. Since striped display continues from the time point t=1.0 onward, the greatest value among the power values S(1) to S(ne) is maintained at approximately 50% from the time point t=1.0 onward also. Therefore, as illustrated in FIG. 21, from the time point t=1.0 onward, gain multiplication circuit 44 multiplies an R signal, a G signal, and a B signal included in a delay signal representing striped white display and black display by 0.8 as the gain. By this means, as illustrated in image (f) in FIG. 20, at the time point t=1.5, although the upper half of display unit 70 is switched to striped white display and black display, the luminance of the white display regions is lower than a luminance of white display represented by the delay signal. At the time point t=2.0 and the time point t=3.0, display unit 70 becomes a striped display as illustrated in images (g) and (h) in FIG. 20, respectively, and the luminance of the white display regions is lower than the luminance of white display represented by the delay signal.

As described above, current limiting circuit 240 according to the present embodiment calculates a gain by which a delay signal is to be multiplied, based on power consumption of pixels corresponding to a video signal for two frames. By this means, the power consumption of the display panel can be reduced even when a luminance represented by a video signal abruptly increases. Further, current limiting circuit 240 according to the present embodiment calculates power values, and calculates a gain based on a display screen power value that is the greatest power value among the power values. By this means, the occurrence of a situation in which the power consumption of pixels is reduced too much can be suppressed.

Other Embodiments

Although the present disclosure has been described above based on the exemplary embodiments, the present disclosure is not limited to such embodiments. The present disclosure also encompasses: other embodiments implemented by combining arbitrary constituent elements in the embodiments; variations obtained by making various modifications conceivable to those skilled in the art, to the embodiments within the scope of the present disclosure; and various apparatuses that include, for example, the processing circuit according to the embodiments.

Figure 22:
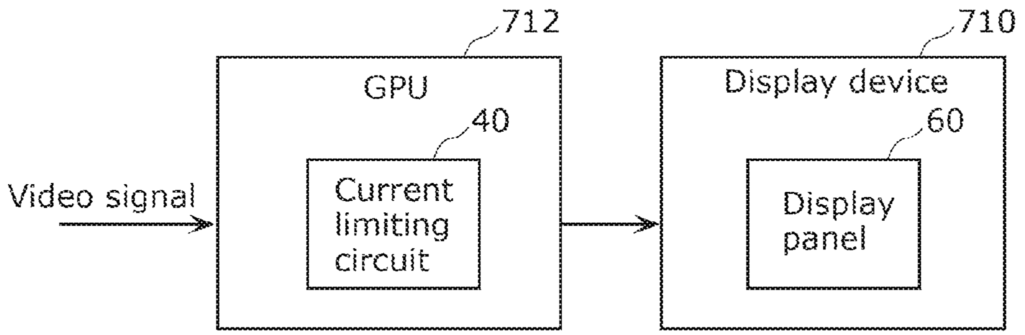
FIG. 22 is a block diagram illustrating a relationship between a current limiting circuit and a display device according to a variation.
Figure 23:
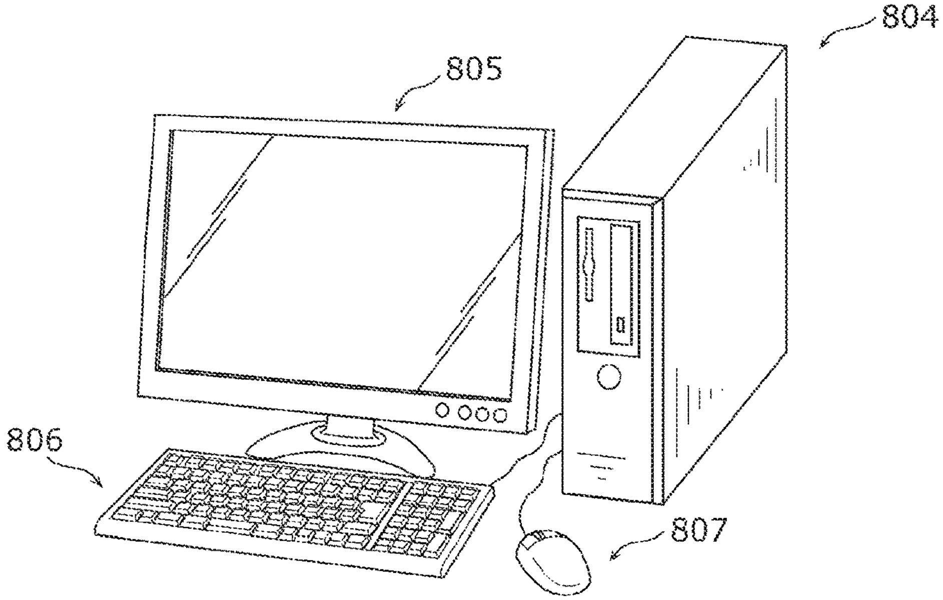
FIG. 23 is an external view of a personal computer (PC) which includes the current limiting circuit according to the variation.
Figure 24:
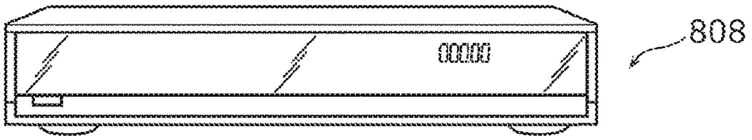
FIG. 24 is an external view of a hard disk recorder which includes the current limiting circuit according to the variation.

For example, in the above embodiments, each current limiting circuit is included in the display device, but the current limiting circuit need not necessarily be included in the display device. Such a variation is described with reference to FIG. 22. FIG. 22 is a block diagram illustrating a relationship between current limiting circuit 40 and display device 710 according to the present variation. As illustrated in FIG. 22, current limiting circuit 40 is included in graphics processing unit (GPU) 712. GPU 712 is a calculation device for image processing, receives a video signal, and outputs a signal obtained by current limiting circuit 40 multiplying, by a gain, a delay signal obtained by delaying the video signal. GPU 712 is disposed outside display device 710. GPU 712 may be included in, for example, personal computer (PC) 804 as illustrated in FIG. 23. PC 804 is operated using keyboard 806 and mouse 807, for example. Display device 710 may be included in monitor 805 illustrated in FIG. 23. Monitor 805 includes display device 710, and displays a video signal received from PC 804. GPU 712 may be included in hard-disk recorder 808 as illustrated in FIG. 24.

Even when the current limiting circuit according to each of the above embodiments is not included in the display device as described above, the same advantageous effects as those provided by the current limiting circuit according to each of the above embodiments are provided.

Figure 25:
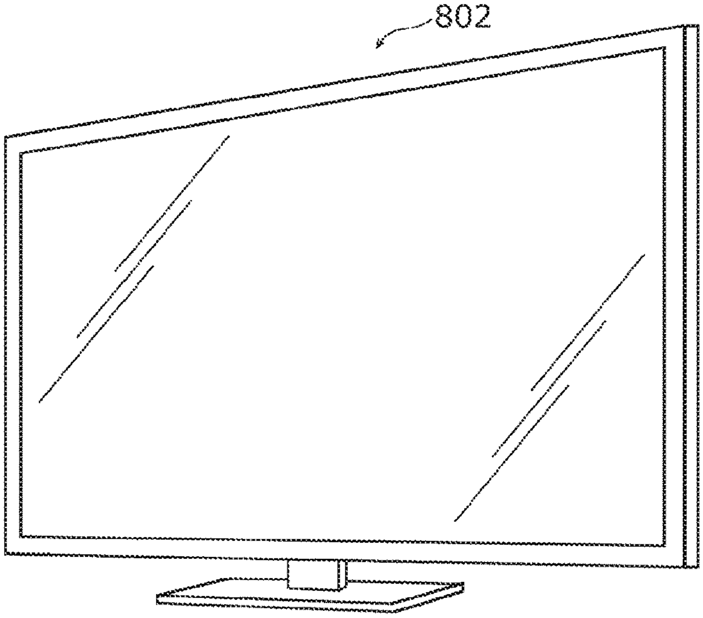
FIG. 25 is an external view of a thin flat television set (TV) which includes the display device according to each embodiment.

Also, the display device according to each of the above embodiments may be included in thin flat TV 802 as illustrated in FIG. 25. Even in this case, the same advantageous effects as those provided by each of the above embodiments are provided.

The configuration described in the above embodiments is the configuration in which each of the pixels of the display panel includes three sub-pixels corresponding to three colors of R, G, and B. The pixel configuration, however, is not limited to this. For example, each pixel may include four sub-pixels corresponding to four colors of R, G, B, and W. When the display panel is a monochrome display panel, each pixel may include a single circuit illustrated in FIG. 7.

Although current limiting circuit 40 according to Embodiment 1 and current limiting circuit 140 according to Embodiment 2 calculate the first power conversion data using weighted averaging circuit 53 and horizontal period data calculation circuit 54, the current limiting circuit according to the present disclosure is not limited to this. For example, the current limiting circuit may calculate the first power conversion data using circuits equivalent to horizontal period data calculation circuits 152*r*, 152*g*, and 152*b* and a circuit equivalent to weighted averaging circuit 151.

In the above embodiments, the video signal includes an R signal, a G signal, and a B signal; however, the video signal may include a signal other than an R signal, a G signal, and a B signal. That is to say, it is sufficient so long as the video signal includes an R signal, a G signal, and a B signal.

The video signal is not limited to a signal including an R signal, a G signal, and a B signal. For example, the video signal may be a chrominance signal including a luminance signal.

Also, in the above embodiments, organic EL elements are used as self luminous elements; however, the self luminous elements are not limited to this example. For example, inorganic EL elements or the like may be used as the self luminous elements.

Also, part of the constituent elements of the current limiting circuit according to each of the above embodiments may be a computer system including, for example, a microprocessor, read-only memory (ROM), random-access memory (RAM), a hard disk unit, a display unit, a keyboard, and a mouse. A computer program is recorded on the RAM or the hard disk unit. Functions are achieved as a result of the microprocessor operating according to the computer program. Here, the computer program is configured by combining a plurality of instruction codes indicating instructions for the computer in order to achieve given functions.

Also, part of the constituent elements of the current limiting circuit according to each of the above embodiments may be configured from one system large-scale integration (LSI) circuit. A system LSI circuit is a super-multifunction LSI circuit manufactured with a plurality of components integrated on a single chip, and is specifically a computer system including a microprocessor, ROM, and RAM, for example. A computer program is stored in the RAM. The system LSI achieves its function as a result of the microprocessor operating according to the computer program.

Also, part of the constituent elements of the current limiting circuit according to each of the above embodiments may each be configured as an integrated circuit (IC) card that is detachably attached to each device, or as a stand-alone module. The IC card and the module are computer systems including a microprocessor, ROM, and RAM, for example. The IC card and the module may include the super-multifunction LSI circuit described above. The IC card and the module achieve their functions as a result of the microprocessor operating according to a computer program. The IC card and the module may be tamperproof.

Further, part of the constituent elements of the current limiting circuit according to each of the above embodiments may also be implemented as the computer program or the digital signal recorded on a computer-readable recording medium such as a flexible disk, hard disk, compact-disc ROM (CD-ROM), magneto-optical (MO) disc, digital versatile disc (DVD), DVD-ROM, DVD-RAM, a Blu-ray (registered trademark) Disc (BD), or a semiconductor memory, for example. Furthermore, it may be implemented as the digital signal recorded on these recording media.

Also, part of the constituent elements of the current limiting circuit according to each of the above embodiments may also be implemented by transmitting the computer program or the digital signal via, for example, an electric communication line, a wireless or wired communication line, a network such as the Internet, or data broadcasting.

The present disclosure may be implemented as the methods described above. The present disclosure may be a computer program that implements these methods using a computer, or a digital signal that includes the computer program. In addition, the present disclosure may be implemented as a non-transitory computer-readable recording medium such as CD-ROM having the computer program recorded thereon.

Also, the present disclosure may be implemented as a computer system including (i) memory having the computer program stored therein, and (ii) a microprocessor that operates according to the computer program.

Also, the computer program or the digital signal may be implemented by an independent computer system by being recorded on the recording medium and transmitted, or by being transmitted via the network, for example.

The above embodiments and variations may be combined.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is useful for organic EL flat panel displays, and is particularly suitable for use in large-screen displays with high power consumption.

The invention claimed is:

1. A current limiting circuit that receives video signals for a display panel, the display panel including pixels, the current limiting circuit limiting current consumption of the pixels, the current limiting circuit comprising:

a delay circuit that receives a first video signal, and outputs a delay video signal obtained by delaying the first video signal by a time period corresponding to one frame;

a calculation circuit that receives a second video signal, the second video signal being received by the current limiting circuit after the first video signal is received by the current limiting circuit, and calculates a gain by which the delay video signal is to be multiplied, based on power consumption of the pixels corresponding to the delay video signal and power consumption of the pixels corresponding to the second video signal; and a gain multiplication circuit that multiplies the delay video signal by the gain.

2. The current limiting circuit according to claim 1, wherein the calculation circuit:

calculates a display screen power value that is a prediction value of the power consumption of the pixels corresponding to the delay video signal; and calculates a display screen power value that is a prediction value of the power consumption of the pixels corresponding to the second video signal.

3. The current limiting circuit according to claim 2, wherein the calculation circuit includes:

a comparison circuit that receives first power conversion data and second power conversion data, and outputs a greater one of the first power conversion data and the second power conversion data, the first power conversion data being power consumption of the pixels corresponding to the delay video signal for at least one horizontal period, the second power conversion data being power consumption of the pixels corresponding to the second video signal for at least one horizontal period that is one frame after the first video signal; and a gain calculation circuit that calculates a power value by adding up outputs of the comparison circuit for one frame, and calculates the gain based on the power value.

4. The current limiting circuit according to claim 2, wherein the gain is less than 1 when a greatest display screen power value is greater than a control target power value, the control target power value being a control target upper limit of power consumption of the pixels.

5. The current limiting circuit according to claim 4, wherein, when the greatest display screen power value is greater than the control target power value, the gain is less than or equal to a value obtained by dividing the control target power value by the greatest display screen power value.

6. The current limiting circuit according to claim 1, wherein the calculation circuit calculates and outputs the gain for each period shorter than a vertical period of the video signal.

7. The current limiting circuit according to claim 1, wherein each of the video signals includes a red (R) signal, a green (G) signal, and a blue (B) signal.

8. The current limiting circuit according to claim 7, further comprising:

a first weighted averaging circuit that calculates a weighted average of a pixel value of an R signal included in the delay video signal, a pixel value of a G signal included in the delay video signal, and a pixel value of a B signal included in the delay video signal; and a second weighted averaging circuit that calculates a weighted average of a pixel value of the R signal included in the second video signal, a pixel value of the G signal included in the second video signal, and a pixel value of the B signal included in the second video signal, wherein the first weighted averaging circuit and the second weighted averaging circuit are integrated.

9. A display device comprising:

the current limiting circuit according to claim 1; and the display panel.

10. A current limiting circuit that receives video signals for a display panel, the display panel including pixels, the current limiting circuit limiting current consumption of the pixels, the current limiting circuit comprising:

a delay circuit that receives a first video signal, and outputs a delay video signal obtained by delaying the first video signal by a time period corresponding to one frame;

a calculation circuit that receives a second video signal, the second video signal being received by the current limiting circuit after the first video signal is received by the current limiting circuit, and calculates a gain by which the delay video signal is to be multiplied, based on power consumption of the pixels corresponding to the first video signal and the second video signal, the first video signal and the second video signal being two continuous frames; and a gain multiplication circuit that multiplies the delay video signal by the gain.

11. The current limiting circuit according to claim 10, wherein the calculation circuit calculates power values, and calculates the gain, based on a greatest power value among the power values calculated, the greatest power value being a display screen power value, and the power values indicate power consumption of the pixels corresponding to the first video signal and the second video signal of the two continuous frames.

12. The current limiting circuit according to claim 11, wherein the gain is less than 1 when the display screen power value is greater than a control target power value, the control target power value being a control target upper limit of power consumption of the pixels.

13. The current limiting circuit according to claim 12, wherein, when the display screen power value is greater than the control target power value, the gain is less than or equal to a value obtained by dividing the control target power value by the display screen power value.

14. The current limiting circuit according to claim 10, wherein the calculation circuit calculates and outputs the gain for each period shorter than a vertical period of the video signal.

15. The current limiting circuit according to claim 10, wherein each of the video signals includes a red (R) signal, a green (G) signal, and a blue (B) signal.

16. The current limiting circuit according to claim 15, further comprising:

a first weighted averaging circuit that calculates a weighted average of a pixel value of an R signal included in the delay video signal, a pixel value of a G signal included in the delay video signal, and a pixel value of a B signal included in the delay video signal; and a second weighted averaging circuit that calculates a weighted average of a pixel value of the R signal included in the second video signal, a pixel value of the G signal included in the second video signal, and a pixel value of the B signal included in the second video signal, wherein the first weighted averaging circuit and the second weighted averaging circuit are integrated.

17. A display device comprising:

the current limiting circuit according to claim 10; and the display panel.

18. A current limiting method for limiting current consumption of pixels, the pixels being included in a display panel, the current limiting method comprising:

outputting a delay video signal obtained by delaying a first video signal by a time period corresponding to one frame, the first video signal being a signal for the display panel including the pixels;

calculating a gain by which the delay video signal is to be multiplied, based on power consumption of the pixels corresponding to the delay video signal and power consumption of the pixels corresponding to a second video signal, the second video signal being received after the first video signal; and multiplying the delay video signal by the gain.

19. A current limiting method for limiting current consumption of pixels, the pixels being included in a display panel, the current limiting method comprising:

outputting a delay video signal obtained by delaying a first video signal by a time period corresponding to one frame, the first video signal being a signal for the display panel including the pixels;

calculating a gain by which the delay video signal is to be multiplied, based on power consumption of the pixels corresponding to the first video signal and a second video signal, the second video signal being received after the first video signal, the first video signal and the second video signal being two continuous frames; and multiplying the delay video signal by the gain.

* * * * *